(12) United States Patent
Corberan Roc et al.

(10) Patent No.: US 10,975,175 B2
(45) Date of Patent: Apr. 13, 2021

(54) PROCESS FOR PREPARING HIGH-REACTIVITY ISOBUTENE HOMO- OR COPOLYMERS

(71) Applicant: BASF SE, Ludwigshafen am Rhein (DE)

(72) Inventors: Rosa Corberan Roc, Ludwigshafen (DE); Klaus Muehlbach, Ludwigshafen (DE); Thomas Wettling, Ludwigshafen (DE); Sergei V. Kostjuk, Minsk (BY); Irina Vasilenko, Minsk (BY); Dmitryi Shiman, Minsk (BY); Ivan Berazianka, Minsk (BY)

(73) Assignee: BASF SE, Ludwigshafen (DE)

( * ) Notice: Subject to any disclaimer, the term of this patent is extended or adjusted under 35 U.S.C. 154(b) by 157 days.

(21) Appl. No.: 16/318,749

(22) PCT Filed: Jul. 14, 2017

(86) PCT No.: PCT/EP2017/067892
§ 371 (c)(1),
(2) Date: Jan. 18, 2019

(87) PCT Pub. No.: WO2018/015306
PCT Pub. Date: Jan. 25, 2018

(65) Prior Publication Data
US 2019/0284313 A1    Sep. 19, 2019

(30) Foreign Application Priority Data
Jul. 22, 2016    (EP) ..................................... 16180673

(51) Int. Cl.
*C08F 10/10* (2006.01)
*C08F 4/10* (2006.01)
(Continued)

(52) U.S. Cl.
CPC ............... *C08F 10/10* (2013.01); *B01J 27/24* (2013.01); *B01J 31/0277* (2013.01);
(Continued)

(58) Field of Classification Search
None
See application file for complete search history.

(56) References Cited

U.S. PATENT DOCUMENTS

| 5,408,018 | A | 4/1995 | Rath | |
|---|---|---|---|---|
| 2002/0010291 | A1* | 1/2002 | Murphy | .................. C08F 10/10 526/133 |
| 2008/0306319 | A1 | 12/2008 | Earle et al. | |

FOREIGN PATENT DOCUMENTS

| CA | 2789843 A1 * | 8/2011 |
|---|---|---|
| DE | 27 02 604 A1 | 7/1978 |

(Continued)

OTHER PUBLICATIONS

Shiman, D. I. et al., "Cationic polymerization of isobutylene by AlCl3/ether complexes in non-polar solvents: Effect of ether structure on the selectivity of b-H elimination". Polymer 2013, 54(9), 2235-2242 (Year: 2013).*

(Continued)

*Primary Examiner* — Richard A Huhn
(74) *Attorney, Agent, or Firm* — Grüneberg and Myers PLLC

(57) ABSTRACT

The present invention relates to a novel process for preparing high-reactivity isobutene homo- or copolymers with a content of terminal vinylidene double bonds per polyisobutene chain end of at least 70 mol %. The present invention further relates to novel isobutene polymers.

20 Claims, 1 Drawing Sheet

(51) Int. Cl.
C08F 4/14 (2006.01)
C08F 4/16 (2006.01)
C08F 4/26 (2006.01)
B01J 27/24 (2006.01)
B01J 31/00 (2006.01)
C08F 4/18 (2006.01)
C08K 5/19 (2006.01)
C08K 5/3445 (2006.01)
C08K 5/3472 (2006.01)
C08K 5/353 (2006.01)
C08K 5/50 (2006.01)
B01J 31/02 (2006.01)

(52) U.S. Cl.
CPC ....... *B01J 31/0282* (2013.01); *B01J 31/0284* (2013.01); *B01J 31/0298* (2013.01); *C08F 4/14* (2013.01); *C08F 4/16* (2013.01); *C08F 4/18* (2013.01); *C08F 4/26* (2013.01); *C08K 5/19* (2013.01); *C08K 5/3445* (2013.01); *C08K 5/3472* (2013.01); *C08K 5/353* (2013.01); *C08K 5/50* (2013.01)

(56) References Cited

FOREIGN PATENT DOCUMENTS

| DE | 10 2007 046 159 A1 | 4/2008 |
|---|---|---|
| EP | 0 145 235 A1 | 6/1985 |
| WO | WO 99/64482 A1 | 12/1999 |
| WO | WO 00/32658 A1 | 6/2000 |
| WO | WO 2007/068910 A2 | 6/2007 |
| WO | WO 2011/101281 A1 | 8/2011 |

OTHER PUBLICATIONS

Leonard, E.C., "Vinyl and Diene Monomers Part 2", ed. Wiley Interscience: A divison of John Wiley & Sons, Inc., 1971, pp. 713-733.

Kostjuk, S.V., et al., "Novel initiating system based on AlCl$_3$etherate for quasiliving cationic polymerization of styrene", Polymer Bulletin, vol. 52, Issue 3-4, Oct. 2004, pp. 227-234.

Shiman, D.I., et al., "Cationic polymerization of isobutylene by AlCl$_3$/ether complexes in non-polar solvents: Effect of ether structure on the selectivity of β-H elimination", Polymer, vol. 54, Issue 9, Apr. 19, 2013, pp. 2235-2242.

Shiman, D.I., et al., "Cationic polymerization of isobutylene by complexes of alkylaluminum dichlorides with diisopropyl ether: An activating effect of water", Journal of Polymer Science Part A: Polymer Chemistry, vol. 52, Issue 16, Aug. 15, 2014, pp. 2386-2393.

Wasserscheid, P., et al., "Ionische Flüssigkeiten—neue „ Lösungen für die Übergangsmetallkatalyse", Angewandte Chemie, vol. 112, Issue 21, Nov. 3, 2000, pp. 3926-3945 (with English translation).

U.S. Appl. No. 16/073,586, Sep. 27, 2018, US 2019-0062472 A1, Corberan, R., et al.

U.S. Appl. No. 16/074,229, Sep. 31, 2018, Corberan, R., et al.

International Search Report dated Oct. 5, 2017 in PCT/EP2017/067892 filed Jul. 14, 2017.

\* cited by examiner

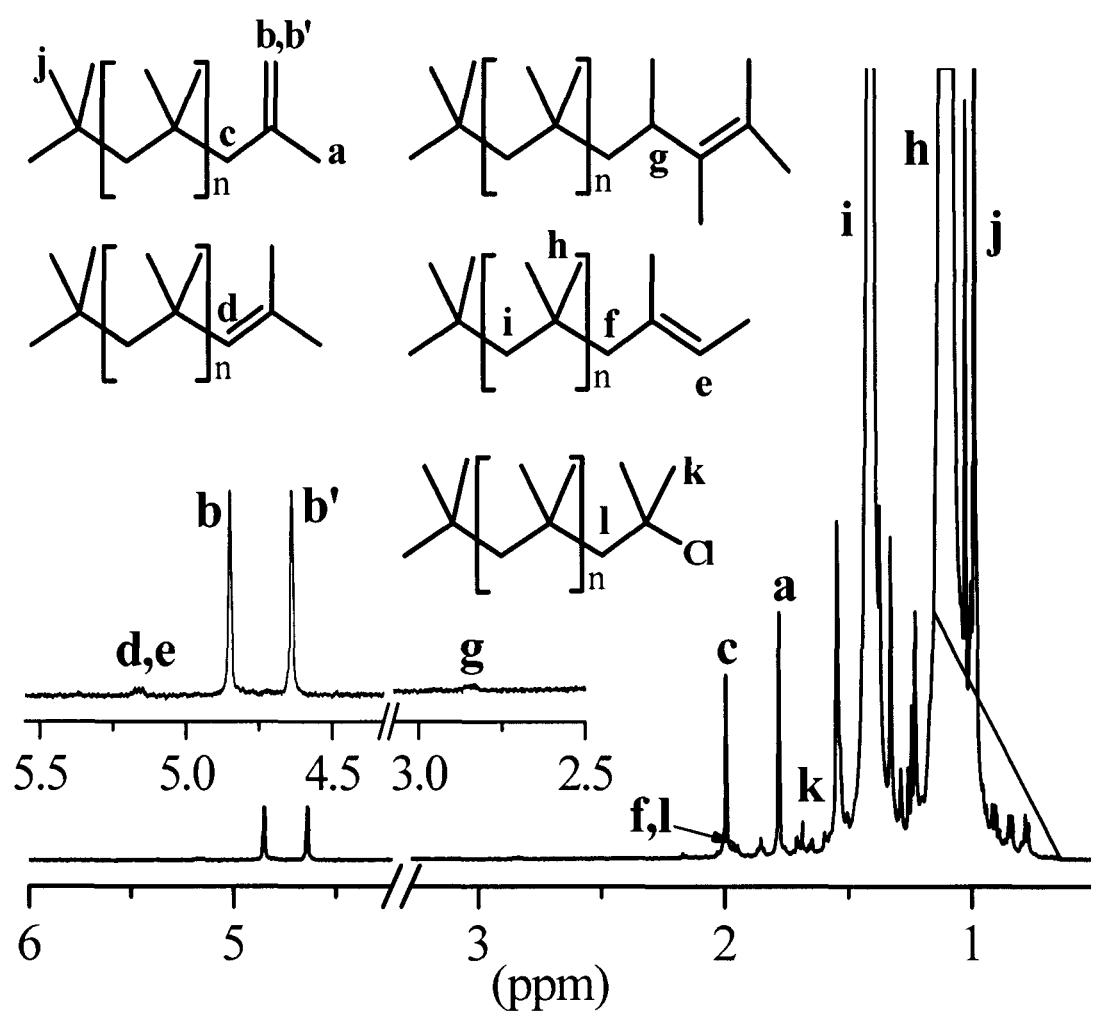

PROCESS FOR PREPARING HIGH-REACTIVITY ISOBUTENE HOMO- OR COPOLYMERS

The present invention relates to a novel process for preparing high-reactivity isobutene homo- or copolymers with a content of terminal vinylidene double bonds per polyisobutene chain end of at least 70 mol %. The present invention further relates to novel isobutene polymers.

In contrast to so-called low-reactivity polymers, high-reactivity isobutene homo- or copolymers are understood to mean those polyisobutenes which comprise a high content of terminal ethylenic double bonds (α-double bonds) and other reactive double bonds susceptible to subsequent reactions, such as Alder-Ene-reaction with maleic acid anhydride, specifically in practice usually of at least 70, preferably at least 75 and very preferably at least 80 mol %, based on the individual chain ends of the polyisobutene macromolecules. In the context of the present application, vinylidene groups are understood to mean those terminal ethylenic double bonds whose position in the polyisobutene macromolecule is described by the general formula

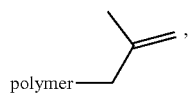

i.e. the double bond is present in an a position in the polymer chain. "Polymer" represents the polyisobutene radical shortened by one isobutene unit. The vinylidene groups exhibit the highest reactivity, for example in the thermal addition onto sterically demanding reactants such as maleic anhydride, whereas a double bond further toward the interior of the macromolecules in most cases exhibits lower reactivity, if any, in functionalization reactions. The uses of high-reactivity polyisobutenes include use as intermediates for preparing additives for lubricants and fuels, as described, for example, in DE-A 27 02 604.

Such high-reactivity polyisobutenes are obtainable, for example, by the process of DE-A 27 02 604 by cationic polymerization of isobutene in the liquid phase in the presence of boron trifluoride as a catalyst. A disadvantage here is that the polyisobutenes obtained have a relatively high polydispersity. The polydispersity is a measure of the molecular weight distribution of the resulting polymer chains and corresponds to the quotient of weight-average molecular weight $M_w$ and number-average molecular weight $M_n$ (PDI=$M_w/M_n$).

Polyisobutenes with a similarly high proportion of terminal double bonds but with a narrower molecular weight distribution are, for example, obtainable by the process of EP-A 145 235, U.S. Pat. No. 5,408,018 and WO 99/64482, the polymerization being effected in the presence of a deactivated catalyst, for example of a complex of boron trifluoride with alcohols and/or ethers.

It has additionally been known for some time that the Lewis acid aluminum trichloride can also be used as a polymerization catalyst for isobutene, for example from High Polymers, volume XXIV (part 2), p. 713-733 (editor: Edward C. Leonard), J. Wiley & Sons publishers, New York, 1971.

In the literature article "Novel initiating system based on AlCl₃ etherate for quasiliving cationic polymerization of styrene" in Polymer Bulletin Vol. 52, p. 227-234 (2004), Sergei V. Kostjuk et al. describe a catalyst system composed of 2-phenyl-2-propanol and an aluminum trichloride/di-n-butyl ether complex for polymerization of styrene. The polydispersities $M_w/M_n$ of the styrene polymers thus prepared are "~2.5" (see summary) or "~3" (see page 230).

Dmitriy I. Shiman, Irina V. Vasilenko, Sergei V. Kostjuk, Journal of Polymer Science, Part A: Polymer Chemistry 2014, 52, 2386-2393 disclose the preparation of polyisobutene polymers by polymerizing isobutene in the presence of an alkylaluminum halogenide an ether complex as a polymerization catalyst.

DE 10 2007 046159 A1 discloses polymerization of isobutene and isobutene containing hydrocarbon mixtures in the presence of ionic liquids, inter ails imidazolium and pyridinium salts. Anions to the ionic liquids may be inter ails halides and ferrates, such as tetrachloroferrates.

DE 10 2007 046159 A1, however, discloses conducting the reaction in anhydrous or aprotic solvents, water, acids and other protic impurities are to be removed prior to polymerization.

The only example uses 1-butyl-3-methylimidazolium tetrachloroferrate(III) as ionic liquid and yields a polyisobutene with a high polydispersity of 3.3. The catalyst is prepared with an intricate change of solvent in which the preparation is conducted in dichloromethane, which is removed after preparation and replaced by hexane. Hence, there is a need for catalyst which can be prepared easier without the need for an exchange of the solvent.

It was an object of the present invention to provide a process for preparing high-reactivity isobutene homo- or copolymers with an increased content of terminal vinylidene double bonds per polyisobutene chain end of at least 70 mol % and simultaneously with a narrow molecular weight distribution (i.e. low polydispersities) in acceptable yields. The catalyst system should at the same time have sufficient activity and service life, the handling thereof should be unproblematic and it should not be prone to failure.

The object was achieved by a process for preparing high-reactivity isobutene homo- or copolymers with a content of terminal vinylidene double bonds per polyisobutene chain end of at least 70, preferably at least 75 and very preferably at least 80 mol %, which comprises polymerizing isobutene or an isobutene-comprising monomer mixture in the presence of at least one Lewis Acid effective as a polymerization catalyst, selected from the group consisting of an aluminum trihalide-donor complex, an alkylaluminum halide-donor complex, an iron trihalide-donor complex, a gallium trihalide-donor complex, a titanium tetrahalide-donor complex, a zinc dihalide-donor complex, a tin dihalide-donor complex, and a tin tetrahalide-donor complex, said complex comprising, as the donor, a mixture of at least organic compound (II) comprising at least one oxygen or nitrogen atom with at least one lone electron pair, preferably comprising at least one oxygen atom with at least one lone electron pair, very preferably selected from the group consisting of organic compounds with at least one ether function, organic compounds with at least one carboxylic ester function, organic compounds with at least one aldehyde function, organic compounds with at least one keto function, and organic compounds with at least one nitrogen containing heterocyclic ring, and at least one ionic liquid.

BRIEF DESCRIPTION OF THE DRAWING

The FIGURE shows the ¹H-NMR shifts attributed to structural elements.

DETAILED DESCRIPTION OF THE INVENTION

Ionic liquids are a class of substances which have been employed for only a relatively short time. They are relatively low-viscosity, relatively noncorrosive salt melts which are liquid at relatively low temperatures, usually less than 100° C., preferably at room temperature. A great deal of research on them is at present being carried out in universities and industry. There are initial commercial applications and it is to be expected that the number of applications will rise sharply in the future. A comprehensive description of ionic liquids is given, for example, by von Wasserscheid and Keim in Angewandte Chemie 2000, 112, 3926-3945.

For the purposes of the present invention, ionic liquids are compounds which have at least one positive charge and at least one negative charge but are electrically neutral overall and have a melting point below 200° C., preferably below 100° C., particularly preferably below 50° C., very preferably below 40° C. and especially below 30° C.

The ionic liquids can also have a plurality of positive or negative charges, for example from 1 to 5, preferably from 1 to 4, particularly preferably from 1 to 3, very particularly preferably 1 or 2 but in particular only one positive charge and one negative charge.

The charges can be located in various localized or delocalized regions within one molecule, i.e. in a betaine-like fashion, or be distributed over separate ions and cations. Preference is given to ionic liquids made up of at least one cation and at least one anion. Cation and anion can, as indicated above, be singly or multiply charged, preferably singly charged.

Of course, mixtures of various ionic liquids are also conceivable.

As cation, preference is given to ammonium or phosphonium ions or cations comprising at least one five- or six-membered heterocycle containing at least one phosphorus or nitrogen atom and, if desired, an oxygen or sulfur atom, particularly preferably compounds comprising at least one five- or six-membered heterocycle containing one, two or three nitrogen atoms and one sulfur or oxygen atom, very particularly preferably ones having one or two nitrogen atoms.

Particularly preferred ionic liquids are ones which have a molecular weight of less than 1000 g/mol, very particularly preferably less than 350 g/mol.

Furthermore, preference is given to cations selected from among the compounds of the formulae (Ia) to (Iw),

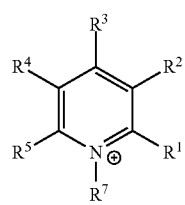

(a)

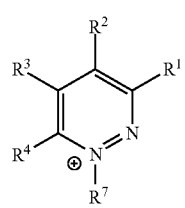

(b)

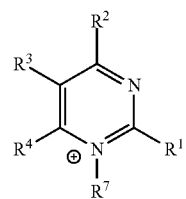

(c)

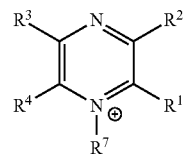

(d)

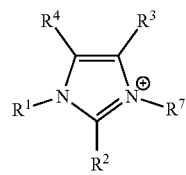

(e)

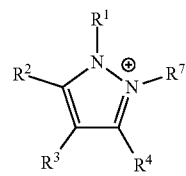

(f)

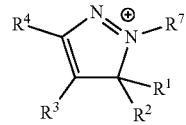

(g)

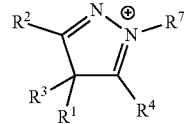

(h)

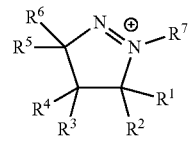

(i)

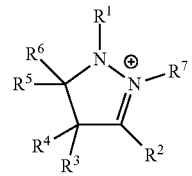

(j)

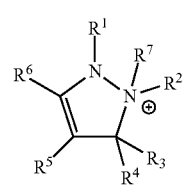

(k)

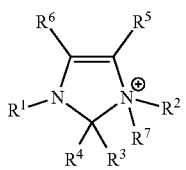
(l)

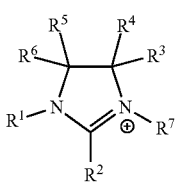
(m)

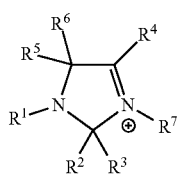
(n)

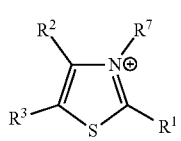
(o)

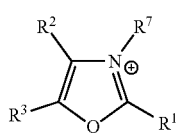
(p)

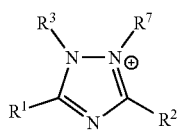
(q)

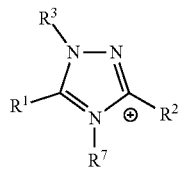
(r)

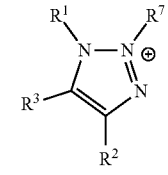
(s)

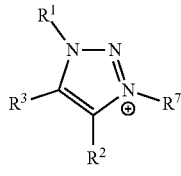
(t)

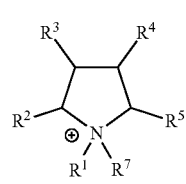
(u)

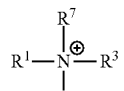
(v)

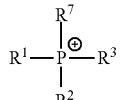
(w)

and oligomers and polymers in which these structures are present, where $R^1$, $R^2$, $R^3$, $R^4$, $R^5$, $R^6$ and $R^7$ are each, independently of one another, $C_1$-$C_8$-alkyl, $C_2$-$C_{18}$-alkyl interrupted by one or more oxygen and/or sulfur atoms and/or one or more substituted or unsubstituted imino groups, $C_6$-$C_{12}$-aryl, $C_5$-$C_{12}$-cycloalkyl or a five- or six-membered, oxygen-, nitrogen- and/or sulfur-containing heterocycle or two of them together form an unsaturated, saturated or aromatic ring which may be interrupted by one or more oxygen and/or sulfur atoms and/or one or more substituted or unsubstituted imino groups, where the radicals mentioned may each be substituted by functional groups, aryl, alkyl, aryloxy, alkyloxy, halogen, heteroatoms and/or heterocycles.

In addition, $R^1$, $R^2$, $R^3$, $R^4$, $R^5$ and $R^6$ can be hydrogen, except for the special case of ammonium and phosphonium ions (Iv) and (Iw).

$R^7$ can also be $C_1$-$C_{18}$-alkyloyl (alkylcarbonyl), $C_1$-$C_{18}$-alkyloxycarbonyl, $C_5$-$C_{12}$-cycloalkylcarbonyl or $C_6$-$C_{12}$-aryloyl (arylcarbonyl), where the radicals mentioned may each be substituted by functional groups, aryl, alkyl, aryloxy, alkyloxy, halogen, heteroatoms and/or heterocycles.

In these definitions $C_1$-$C_{18}$-alkyl which may be substituted by functional groups, aryl, alkyl, aryloxy, alkyloxy, halogen, heteroatoms and/or heterocycles is, for example, methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, heptadecyl, octadecyl, 1,1-dimethylpropyl, 1,1-dimethylbutyl, 1,1,3,3-tetramethylbutyl, benzyl, 1-phenylethyl, 2-phenylethyl, α,α-dimethylbenzyl, benzhydryl, p-tolylmethyl, 1-(p-butylphenyl)ethyl, p-chlorobenzyl, 2,4-dichlorobenzyl, p-methoxybenzyl, methoxybenzyl, 2-cyanoethyl, 2-cyanopropyl, 2-methoxycarbonylethyl, 2-ethoxycarbonylethyl, 2-butoxycarbonyl propyl, 1,2-di-(methoxycarbonyl)ethyl, 2-methoxyethyl, 2-ethoxyethyl, 2-butoxyethyl, diethoxymethyl, diethoxyethyl, 1,3-dioxolan-2-yl, 1,3-dioxan-2-yl, 2-methyl-1,3-dioxolan-2-yl, 4-methyl-1,3-dioxolan-2-yl, 2-isopropoxyethyl, 2-butoxypropyl, 2-octyloxyethyl, chloromethyl, 2-chloroethyl, trichloromethyl, trifluoromethyl, 1,1-dimethyl-2-chloroethyl, 2-methoxyisopropyl, 2-ethoxyethyl, butylthiomethyl, 2-dodecylthioethyl, 2-phenylthioethyl, 2,2,2-trifluoroethyl, 2-hydroxyethyl, 2-hydroxypropyl, 3-hydroxypropyl, 4-hydroxybutyl, 6-hydroxyhexyl, 2-aminoethyl, 2-aminopropyl, 3-aminopropyl, 4-aminobutyl, 6-aminohexyl, 2-methylaminoethyl, 2-methylaminopropyl, 3-methylaminopropyl, 4-methylaminobutyl, 6-methylaminohexyl, 2-dimethylaminoethyl, 2-dimethylaminopropyl, 3-dimethylaminopropyl, 4-dimethylaminobutyl, 6-dimethylaminohexyl, 2-hydroxy-2,2-dimethylethyl, 2-phenoxyethyl, 2-phenoxypropyl, 3-phenoxypropyl, 4-phenoxybutyl, 6-phenoxyhexyl, 2-methoxyethyl, 2-methoxypropyl, 3-methoxypropyl, 4-methoxybutyl, 6-methoxyhexyl, 2-ethoxyethyl, 2-ethoxypropyl, 3-ethoxypropyl, 4-ethoxybutyl or 6-ethoxyhexyl, and $C_2$-$C_{18}$-alkyl interrupted by one or more oxygen and/or sulfur atoms and/or one or more substituted or unsubstituted imino groups is, for example, 5-hydroxy-3-oxa-pentyl, 8-hydroxy-3,6-dioxaoctyl, 11-hydroxy-3,6,9-trioxaundecyl, 7-hydroxy-4-oxaheptyl, 11-hydroxy-4,8-dioxaundecyl, 15-hydroxy-4,8,12-trioxapentadecyl, 9-hydroxy-5-oxanonyl, 14-hydroxy-5,10-oxatetradecyl, 5-methoxy-3-oxapentyl, 8-methoxy-3,6-dioxaoctyl, 11-methoxy-3,6,9-trioxaundecyl, 7-methoxy-4-oxaheptyl, 11-methoxy-4,8-dioxa-undecyl, 15-methoxy-4,8,12-trioxapentadecyl, 9-methoxy-5-oxanonyl, 14-methoxy-5,10-oxatetradecyl, 5-ethoxy-3-oxapentyl, 8-ethoxy-3,6-dioxaoctyl, 11-ethoxy-3,6,9-trioxaundecyl, 7-ethoxy-4-oxaheptyl, 11-ethoxy-4,8-dioxaundecyl, 15-ethoxy-4,8,12-trioxapentadecyl, 9-ethoxy-5-oxanonyl or 14-ethoxy-5,10-oxatetradecyl.

If two radicals form a ring, they can together be 1,3-propylene, 1,4-butylene, 1,5-pentylene, 2-oxa-1,3-propylene, 1-oxa-1,3-propylene, 2-oxa-1,3-propylene, 1-oxa-1,3-propenylene, 1-aza-1,3-propenylene, 1-$C_1$-$C_4$-alkyl-1-aza-1,3-propenylene, 1,4-buta-1,3-dienylene, 1-aza-1,4-buta-1,3-dienylene or 2-aza-1,4-buta-1,3-dienylene.

The number of oxygen and/or sulfur atoms and/or imino groups is not subject to any restrictions. In general, there will be no more than 5 in the radical, preferably no more than 4 and very particularly preferably no more than 3.

Furthermore, there is generally at least one carbon atom, preferably at least two carbon atoms, between any two heteroatoms.

Substituted and unsubstituted imino groups can be, for example, imino, methylimino, isopropylimino, n-butylimino or tert-butylimino.

Furthermore, functional groups can be carboxy, carboxamide, hydroxy, di($C_1$-$C_4$-alkyl)amino, $C_1$-$C_4$-alkyloxycarbonyl, cyano or $C_1$-$C_4$-alkyloxy, $C_6$-$C_{12}$-aryl which may be substituted by functional groups, aryl, alkyl, aryloxy, alkyloxy, halogen, heteroatoms and/or heterocycles is, for example, phenyl, tolyl, xylyl, α-naphthyl, β-naphthyl, 4-diphenylyl, chlorophenyl, dichlorophenyl, trichlorophenyl, difluorophenyl, methylphenyl, dimethylphenyl, trimethylphenyl, ethylphenyl, diethylphenyl, isopropylphenyl, tert-butylphenyl, dodecylphenyl, methoxyphenyl, dimethoxyphenyl, ethoxyphenyl, hexyloxyphenyl, methylnaphthyl, isopropylnaphthyl, chloronaphthyl, ethoxynaphthyl, 2,6-dimethylphenyl, 2,4,6-trimethylphenyl, 2,6-dimethoxyphenyl, 2,6-dichlorophenyl, 4-bromophenyl, 2- or 4-nitrophenyl, 2,4- or 2,6-dinitrophenyl, 4-dimethylaminophenyl, 4-acetylphenyl, methoxyethylphenyl or ethoxymethylphenyl, $C_5$-$C_{12}$-cycloalkyl which may be substituted by functional groups, aryl, alkyl, aryloxy, alkyloxy, halogen, heteroatoms and/or heterocycles is, for example, cyclopentyl, cyclohexyl, cyclooctyl, cyclododecyl, methylcyclopentyl, dimethylcyclopentyl, methylcyclohexyl, dimethylcyclohexyl, diethylcyclohexyl, butylcyclohexyl, methoxycyclohexyl, di methoxycyclohexyl, diethoxycyclohexyl, butylthiocyclohexyl, chlorocyclohexyl, dichlorocyclohexyl, dichlorocyclopentyl or a saturated or unsaturated bicyclic system such as norbornyl or norbornenyl, a five- or six-membered, oxygen-, nitrogen- and/or sulfur-containing heterocycle is, for example, furyl, thienyl, pyrryl, pyridyl, indolyl, benzoxazolyl, dioxolyl, dioxyl, benzimidazolyl, benzothiazolyl, dimethylpyridyl, methylquinolyl, dimethylpyrryl, methoxyfuryl, dimethoxypyridyl, difluoropyridyl, methylthienyl, isopropylthienyl or tert-butylthienyl and $C_1$ to $C_4$-alkyl is, for example, methyl, ethyl, propyl, isopropyl, n-butyl, sec-butyl or tert-butyl.

$C_1$-$C_{18}$-Alkyloyl (alkylcarbonyl) can be, for example, acetyl, propionyl, n-butyloyl, sec-butyloyl, tert-butyloyl, 2-ethylhexylcarbonyl, decanoyl, dodecanoyl, chloroacetyl, trichloroacetyl or trifluoroacetyl.

$C_1$-$C_{18}$-Alkyloxycarbonyl can be, for example, methyloxycarbonyl, ethyloxycarbonyl, propyloxycarbonyl, isopropyloxycarbonyl, n-butyloxycarbonyl, sec-butyloxycarbonyl, tertbutyloxycarbonyl, hexyloxycarbonyl, 2-ethyl hexyloxycarbonyl or benzyloxycarbonyl.

$C_5$-$C_{12}$-Cycloalkylcarbonyl can be, for example, cyclopentylcarbonyl, cyclohexylcarbonyl or cyclododecylcarbonyl.

$C_6$-$C_{12}$-Aryloyl (arylcarbonyl) can be, for example, benzoyl, toluyl, xyloyl, α-naphthoyl, β-naphthoyl, chlorobenzoyl, dichlorobenzoyl, trichlorobenzoyl or trimethylbenzoyl.

Preference is given to $R^1$, $R^2$, $R^3$, $R^4$, $R^5$ and $R^6$ each being, independently of one another, hydrogen, methyl, ethyl, n-butyl, 2-hydroxyethyl, 2-cyanoethyl, 2-(methoxycarbonyl)ethyl, 2-(ethoxycarbonyl)ethyl, 2-(n-butoxycarbonyl)ethyl, dimethylamino, diethylamino or chlorine.

$R^7$ is preferably methyl, ethyl, n-butyl, 2-hydroxyethyl, 2-cyanoethyl, 2-(methoxycarbonyl)ethyl, 2-(ethoxycarbonyl)ethyl, 2-(n-butoxycarbonyl)ethyl, acetyl, propionyl, t-butyryl, methoxycarbonyl, ethoxycarbonyl or n-butoxycarbonyl.

Particularly preferred pyridinium ions (Ia) are those in which one of the radicals $R^1$ to $R^5$ is methyl, ethyl or chlorine, $R^7$ is acetyl, methyl, ethyl or n-butyl and all others are hydrogen, or $R^3$ is dimethylamino, $R^7$ is acetyl, methyl, ethyl or n-butyl and all others are hydrogen or $R^7$ is acetyl, methyl, ethyl or n-butyl and all others are hydrogen or $R^2$ is carboxy or carboxamide, $R^7$ is acetyl, methyl, ethyl or n-butyl and all others are hydrogen or $R^1$ and $R^2$ or $R^2$ and $R^3$ are together 1,4-buta-1,3-dienylene, $R^7$ is acetyl, methyl, ethyl or n-butyl and all others are hydrogen.

Particularly preferred pyridazinium ions (Ib) are those in which one of the radicals $R^1$ to $R^4$ is methyl or ethyl, $R^7$ is acetyl, methyl, ethyl or n-butyl and all others are hydrogen or $R^7$ is acetyl, methyl, ethyl or n-butyl and all others are hydrogen.

Particularly preferred pyrimidinium ions (Ic) are those in which $R^2$ to $R^4$ are each hydrogen or methyl, $R^7$ is acetyl, methyl, ethyl or n-butyl and $R^1$ is hydrogen, methyl or ethyl, or $R^2$ and $R^4$ are each methyl, $R^3$ is hydrogen and $R^1$ is hydrogen, methyl or ethyl and $R^7$ is acetyl, methyl, ethyl or n-butyl or $R^1$ and $R^7$ together form a 1,3-propylene-, 1,4-butylene- or 1,5-pentylene-chain and all others are hydrogen.

Particularly preferred pyrazinium ions (Id) are those in which $R^1$ to $R^4$ are all methyl and $R^7$ is acetyl, methyl, ethyl or n-butyl or $R^7$ is acetyl, methyl, ethyl or n-butyl and all others are hydrogen.

Particularly preferred imidazolium ions (Ie) are those in which, independently of one another, $R^1$ is selected from among methyl, ethyl, n-propyl, n-butyl, n-pentyl, n-octyl, n-decyl, n-dodecyl, 2-hydroxyethyl and 2-cyanoethyl, $R^7$ is acetyl, methyl, ethyl or n-butyl and $R^2$ to $R^4$ are each, independently of one another, hydrogen, methyl or ethyl.

Particularly preferred 1H-pyrazolium ions (If) are those in which, independently of one another, $R^1$ is selected from among hydrogen, methyl and ethyl, $R^2$, $R^3$ and $R^4$ are selected from among hydrogen and methyl and $R^7$ is selected from among acetyl, methyl, ethyl and n-butyl.

Particularly preferred 3H-pyrazolium ions (Ig) are those in which, independently of one another, $R^1$ is selected from among hydrogen, methyl and ethyl, $R^2$, $R^3$ and $R^4$ are selected from among hydrogen and methyl and $R^7$ is selected from among acetyl, methyl, ethyl and n-butyl.

Particularly preferred 4H-pyrazolium ions (Ih) are those in which, independently of one another, $R^1$ to $R^4$ are selected from among hydrogen and methyl and $R^7$ is selected from among acetyl, methyl, ethyl and n-butyl.

Particularly preferred 1-pyrazolinium ions (Ii) are those in which, independently of one another, $R^1$ to $R^6$ are selected from among hydrogen and methyl and $R^7$ is selected from among acetyl, methyl, ethyl and n-butyl.

Particularly preferred 2-pyrazolinium ions (Ij) are those in which, independently of one another, $R^1$ is selected from among hydrogen, methyl, ethyl and phenyl, $R^7$ is selected from among acetyl, methyl, ethyl and n-butyl and $R^2$ to $R^6$ are selected from among hydrogen and methyl.

Particularly preferred 3-pyrazolinium ions (Ik) are those in which, independently of one another, $R^1$ and $R^2$ are selected from among hydrogen, methyl, ethyl and phenyl, $R^7$ is selected from among acetyl, methyl, ethyl and n-butyl and $R^3$ to $R^6$ are selected from among hydrogen and methyl.

Particularly preferred imidazolinium ions (Il) are those in which, independently of one another, $R^1$ and $R^2$ are selected from among hydrogen, methyl, ethyl, n-butyl and phenyl, $R^7$ is selected from among acetyl, methyl, ethyl and n-butyl and $R^3$ and $R^4$ are selected from among hydrogen, methyl and ethyl and $R^5$ and $R^6$ are selected from among hydrogen and methyl.

Particularly preferred imidazolinium ions (Im) are those in which, independently of one another, $R^1$ and $R^2$ are selected from among hydrogen, methyl and ethyl, $R^7$ is selected from among acetyl, methyl, ethyl and n-butyl and $R^3$ to $R^6$ are selected from among hydrogen and methyl.

Particularly preferred imidazolinium ions (In) are those in which, independently of one another, $R^1$, $R^2$ and $R^3$ are selected from among hydrogen, methyl and ethyl, $R^7$ is selected from among acetyl, methyl, ethyl and n-butyl and $R^4$ to $R^6$ are selected from among hydrogen and methyl.

Particularly preferred thiazolium ions (Io) or oxazolium ions (Ip) are those in which, independently of one another, $R^1$ is selected from among hydrogen, methyl, ethyl and phenyl, $R^7$ is selected from among acetyl, methyl, ethyl and n-butyl and $R^2$ and $R^3$ are selected from among hydrogen and methyl.

Particularly preferred 1,2,4-triazolium ions (Iq) and (Ir) are those in which, independently of one another, $R^1$ and $R^2$ are selected from among hydrogen, methyl, ethyl and phenyl, $R^7$ is selected from among acetyl, methyl, ethyl and n-butyl and $R^3$ is selected from among hydrogen, methyl and phenyl.

Particularly preferred 1,2,3-triazolium ions (Is) and (It) are those in which, independently of one another, $R^1$ is selected from among hydrogen, methyl and ethyl, $R^7$ is selected from among acetyl, methyl, ethyl and n-butyl and $R^2$ and $R^3$ are selected from among hydrogen and methyl or $R^2$ and $R^3$ are together 1,4-buta-1,3-dienylene and all others are hydrogen.

Particularly preferred pyrrolidinium ions (Iu) are those in which, independently of one another, $R^1$ and $R^7$ are selected from among acetyl, methyl, ethyl and n-butyl and $R^2$, $R^3$, $R^4$ and $R^5$ are each hydrogen.

Particularly preferred ammonium ions (Iv) are those in which, independently of one another, $R^7$ is selected from among acetyl, methyl, ethyl and n-butyl and $R^1$, $R^2$ and $R^3$ are selected from among methyl, ethyl, n-butyl, 2-hydroxyethyl, benzyl and phenyl.

Particularly preferred phosphonium ions (Iw) are those in which, independently of one another, $R^7$ is selected from among acetyl, methyl, ethyl and n-butyl and $R^1$, $R^2$ and $R^3$ are selected from among phenyl, phenoxy, ethoxy and n-butoxy.

Among these, preference is given to the ammonium, phosphonium, pyrrolidinium, pyridinium and imidazolium ions, special preference is given to the pyridinium and imidazolium ions and especially to imidazolium ions.

Very particularly preferred cations are 1,2-dimethylpyridinium, 1-methyl-2-ethylpyridinium, 1-methyl-2-ethyl-6-methylpyridinium, N-methylpyridinium, 1-butyl-2-methylpyridinium, 1-butyl-2-ethylpyridinium, 1-butyl-2-ethyl-6-methylpyridinium, N-butylpyridinium, 1-butyl-4-methylpyridinium, 1,3-dimethylimidazolium, 1,2,3-trimethylimidazolium, 1-ethyl-3-methylimidazolium (emim), 1-n-butyl-3-methylimidazolium (bmim), 1,3,4,5-tetramethylimidazolium, 1,3,4-trimethylimidazolium, 2,3-dimethylimidazolium, 1-butyl-2,3-dimethylimidazolium, 3,4-dimethylimidazolium, 2-ethyl-3,4-dimethylimidazolium, 3-methyl-2-ethylimidazole, 3-butyl-1-ethylimidazolium, 3-butyl-1,2-dimethylimidazolium, 1,3-di-n-butylimidazolium, 3-butyl-1,4,5-trimethylimidazolium, 3-butyl-1,4-dimethylimidazolium, 3-butyl-2-methylimidazolium, 1,3-dibutyl-2-methylimidazolium, 3-butyl-4-methylimidazolium, 3-butyl-2-ethyl-4-methylimidazolium and 3-butyl-2-ethylimidazolium, 1-methyl-3-octylimidazolium, 1-decyl-3-methylimidazolium.

Especial preference is given to 1-butyl-4-methylpyridinium, 1-n-ethyl-3-methylimidazolium, 1-n-butyl-3-methylimidazolium and 1-n-butyl-3-ethylimidazolium.

In a preferred embodiment, the imidazolium salt is of the general formula (I)

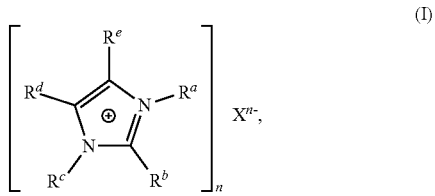

in which
the variables $R^a$ and $R^c$ are each independently an organic radical having 1 to 3000 carbon atoms,
the variables $R^b$, $R^d$, and $R^e$ are each independently hydrogen or an organic radical having 1 to 3000 carbon atoms,
X is an anion, and
n is the number 1, 2 or 3.

Isobutene homopolymers are understood in the context of the present invention to mean those polymers which, based on the polymer, are formed from isobutene to an extent of at least 98 mol %, preferably to an extent of at least 99 mol %. Accordingly, isobutene copolymers are understood to mean those polymers which comprise less than 2 mol %, preferably less than 1 mol %, very preferably less than 0.7 mol % and especially less than 0.5 mol % of copolymerized monomers other than isobutene, for example isoprene or linear butenes, preferably 1-butene, cis-2-butene, and trans-2-butene.

In the context of the present invention, the following definitions apply to generically defined radicals:

A $C_1$- to $C_8$-alkyl radical is a linear or branched alkyl radical having 1 to 8 carbon atoms. Examples thereof are methyl, ethyl, n-propyl, isopropyl, n-butyl, 2-butyl, isobutyl, tert-butyl, pentyl, 1-methylbutyl, 2-methylbutyl, 3-methylbutyl, 2,2-dimethyl-propyl, 1-ethylpropyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, n-heptyl, n-octyl and the constitutional isomers thereof, such as 2-ethylhexyl. Such $C_1$- to $C_8$-alkyl radicals may to a small extent also comprise heteroatoms such as oxygen, nitrogen or halogen atoms, for example chlorine, and/or aprotic functional groups, for example carboxyl ester groups, cyano groups or nitro groups.

A $C_1$- to $C_{20}$-alkyl radical is a linear or branched alkyl radical having 1 to 20 carbon atoms. Examples thereof are the abovementioned $C_1$- to $C_8$-alkyl radicals, and additionally n-nonyl, isononyl, n-decyl, 2-propylheptyl, n-undecyl, n-dodecyl, n-tridecyl, isotridecyl, n-tetradecyl, n-hexadecyl, n-octadecyl and n-eicosyl. Such $C_1$- to $C_{20}$-alkyl radicals may to a small extent also comprise heteroatoms such as oxygen, nitrogen or halogen atoms, for example chlorine, and/or aprotic functional groups, for example carboxyl ester groups, cyano groups or nitro groups.

A $C_5$- to $C_8$-cycloalkyl radical is a saturated cyclic radical which may comprise alkyl side chains. Examples thereof are cyclopentyl, 2- or 3-methylcyclopentyl, 2,3-, 2,4- or 2,5-dimethylcyclopentyl, cyclohexyl, 2-, 3- or 4-methylcyclohexyl, 2,3-, 2,4-, 2,5-, 2,6-, 3,4-, 3,5- or 3,6-dimethylcyclohexyl, cycloheptyl, 2-, 3- or 4-methylcycloheptyl, cyclooctyl, 2-, 3-, 4- or 5-methylcyclooctyl.

Such $C_5$- to $C_8$-cycloalkyl radicals may to a small extent also comprise heteroatoms such as oxygen, nitrogen or halogen atoms, for example chlorine, and/or aprotic functional groups, for example carboxyl ester groups, cyano groups or nitro groups.

A $C_6$- to $C_{20}$-aryl radical or a $C_6$- to $C_{12}$-aryl radical is preferably optionally substituted phenyl, optionally substituted naphthyl, optionally substituted anthracenyl or optionally substituted phenanthrenyl. Such aryl radicals may be a 1 to 5 aprotic substituents or aprotic functional groups, for example $C_1$- to $C_8$-alkyl, $C_1$- to $C_8$-haloalkyl such as $C_1$- to $C_8$-chloroalkyl or $C_1$- to $C_8$-fluoroalkyl, halogens such as chlorine or fluorine, nitro, cyano or phenyl. Examples of such aryl radicals are phenyl, naphthyl, biphenyl, anthracenyl, phenanthrenyl, tolyl, nitrophenyl, chlorophenyl, dichlorophenyl, pentafluorophenyl, pentachlorophenyl, (trifluoromethyl)phenyl, bis(trifluoromethyl)phenyl, (trichloro)methylphenyl and bis(trichloromethyl)phenyl.

A $C_7$- to $C_{20}$-arylalkyl radical or a $C_7$- to $C_{12}$-arylalkyl radical is preferably optionally substituted $C_1$- to $C_4$-alkylphenyl such as benzyl, o-, m- or p-methylbenzyl, 1- or 2-phenylethyl, 1-, 2- or 3-phenylpropyl or 1-, 2-, 3- or 4-phenylbutyl, optionally substituted $C_1$- to $C_4$-alkylnaphthyl such as naphthylmethyl, optionally substituted $C_1$- to $C_4$-alkylanthracenyl such as anthracenylmethyl, or optionally substituted $C_1$- to $C_4$-alkylphenanthrenyl such as phenanthrenylmethyl. Such arylalkyl radicals may bear 1 to 5 aprotic substituents or aprotic functional groups, especially on the aryl moiety, for example $C_1$- to $C_8$-alkyl, $C_1$- to $C_8$-haloalkyl such as $C_1$- to $C_8$-chloroalkyl or $C_1$- to $C_8$-fluoroalkyl, halogen such as chlorine or fluorine, nitro or phenyl.

A suitable aluminum trihalide is especially aluminum trifluoride, aluminum trichloride or aluminum tribromide, preferably aluminum trichloride.

A useful alkylaluminum halide is especially a mono($C_1$- to $C_4$-alkyl)aluminum dihalide or a di($C_1$- to $C_4$-alkyl) aluminum monohalide, for example methylaluminum dichloride, ethylaluminum dichloride, iso-butylaluminum dichloride, dimethylaluminum chloride or diethylaluminum chloride, diiso-butylaluminum chloride, preferably ethylaluminum dichloride, iso-butylaluminum dichloride, diethylaluminum chloride or diiso-butylaluminum chloride and very preferably ethylaluminum dichloride and iso-butylaluminum dichloride.

Especially suitable iron trihalides are iron trifluoride, iron trichloride or iron tribromide, preferably iron trichloride.

Especially suitable gallium trihalides are gallium trifluoride, gallium trichloride or gallium tribromide, preferably gallium trichloride.

Especially suitable titanium tetrahalides are titanium tetrafluorides, titanium tetrachlorides or titanium tetrabromides, preferably titanium tetrachlorides.

Especially suitable zinc dihalides are zinc difluorides, zinc dichlorides, or zinc dibromides, preferably zinc dichlorides.

Especially suitable tin dihalides are tin difluorides, tin dichlorides, or tin dibromides, preferably tin dichlorides.

Especially suitable tin tetrahalides are tin tetrafluorides, tin tetrachlorides, or tin tetrabromides, preferably tin tetrachlorides.

Among these Lewis Acids, aluminum trihalides, alkylaluminum halides, iron trihalides, gallium trihalides, and titanium tetrahalides are preferred.

Very preferred are aluminum trihalides, alkylaluminum halides, gallium trihalides, and iron trihalides, particularly preferred are aluminum trihalides, iron trihalides, and titanium tetrahalides, especially aluminum trihalides.

In a preferred embodiment, isobutene or an isobutene-comprising monomer mixture is polymerized in the presence of an alkyl aluminum dichloride-donor complex or an dialkyl aluminum chloride-donor complex effective as a polymerization catalyst, very preferably in the presence of an aluminum trichloride-donor complex or an iron trichloride-donor complex.

According to the invention the aluminum trihalide-donor complex or alkylaluminum halide-donor complex or the iron trihalide-donor complex or the gallium trihalide-donor complex or the titanium tetrahalide-donor complex or the zinc dihalide-donor complex or the tin dihalide-donor complex or the tin tetrahalide-donor complex effective as a polymerization catalyst comprises, as the donor, a mixture of
    at least one organic compound (II) comprising at least one oxygen or nitrogen atom with at least one lone electron pair, preferably comprising at least one oxygen atom with at least one lone electron pair, very preferably selected from the group consisting of organic compounds with at least one ether function, organic compounds with at least one carboxylic ester function, organic compounds with at least one aldehyde function, organic compounds with at least one keto function, and organic compounds with at least one nitrogen containing heterocyclic ring
    with at least one compound of formula (Ia) to (Iw).

Compounds (II) comprise at least one oxygen and/or nitrogen atom with at least one lone electron pair, preferably at least one oxygen atom with at least one lone electron pair and very preferably are selected from the group consisting of organic compounds with at least one ether function, organic compounds with at least one carboxylic ester function, organic compounds with at least one aldehyde function, organic compounds with at least one keto function, and organic compounds with at least one nitrogen containing heterocyclic ring.

Solely oxygen containing compounds (II) are preferred over nitrogen-containing compounds (II).

Preferably compound (II) is selected from the group consisting of organic compounds with at least one ether function, organic compounds with at least one carboxylic ester function and organic compounds with at least one keto function, more preferably selected from the group consisting of organic compounds with at least one ether function and organic compounds with at least one carboxylic ester function, very preferably compounds (II) are organic compounds with at least one ether function, and especially organic compounds with exactly one ether function.

Compounds with at least one ether function are also understood to mean acetals and hemiacetals. The ether compound may comprise one or more ether functions, e.g. one, two, three, four or even more ether functions, preferably one or two ether functions and very preferably one ether function.

The mixture of donors may comprise one, two, three, four or even more different compounds (II), preferably compounds with at least one ether function, preferably one or two different compounds and very preferably one compound.

The mixture of donors may comprise one, two, three, four or even more different compounds of formula (Ia) to (Iw), preferably one or two different compounds and very preferably one compound.

In a preferred embodiment of the present invention, an aluminum trihalide-donor complex or an alkylaluminum halide complex, or an iron trihalide-donor complex, or a gallium trihalide-donor complex or a titanium tetrahalide-donor complex or a zinc dihalide-donor complex or a tin dihaide-donor complex or the tin tetrahalide-donor complex, very preferably an aluminum trihalide-donor complex or an iron trihalide-donor complex and especially an aluminum trihalide-donor complex is used, which comprises, as the donor, a mixture of
    at least one dihydrocarbyl ether the general formula $R^9$—O—$R^9$ in which the variables $R^8$ and $R^9$ are each independently $C_1$- to $C_{20}$-alkyl radicals, preferably $C_1$- to $C_8$ alkyl radicals especially $C_1$- to $C_4$ alkyl radicals, $C_1$- to $C_{20}$-haloalkyl radicals, preferably $C_1$- to $C_8$ haloalkyl radicals especially $C_1$- to $C_4$ haloalkyl radicals, $C_5$- to $C_8$-cycloalkyl radicals, preferably $C_5$- to $C_6$-cycloalkyl radicals, $C_6$- to $C_{20}$-aryl radicals, especially $C_6$- to $C_{12}$ aryl radicals, $C_6$- to $C_{20}$-haloaryl radicals, especially $C_6$- to $C_{12}$ haloaryl radicals, or $C_7$- to $C_{20}$-arylalkyl radicals, especially $C_7$- to $C_{12}$-arylalkyl radicals. Preference is given to $C_1$- to $C_4$ alkyl radicals, $C_1$- to $C_4$ haloalkyl radicals, $C_6$- to $C_{12}$ aryl radicals, and $C_7$- to $C_{12}$-arylalkyl radicals with
    at least one compound of formula (Ia) to (Iw).

Haloalkyl and haloaryl mean preferably chloroalkyl or bromoalkyl and chloroaryl or bromoaryl, very preferably chloroalkyl and chloroaryl. Especially preferred are w-haloalkyl radicals.

Preferred examples are chloromethyl, 1-chloroeth-1-yl, 2-chloroeth-1-yl, 2-chloroprop-1-yl, 2-chloroprop-2-yl, 3-chloroprop-1-yl, and 4-chlorobut-1-yl.

Preferred examples for chloroaryl are 2-chlorophenyl, 3-chlorophenyl, and 4-chlorophenyl.

The dihydrocarbyl ethers mentioned may be open-chain or cyclic, where the two variables $R^8$ and $R^9$ in the case of the cyclic ethers may join to form a ring, where such rings may also comprise two or three ether oxygen atoms. Examples of such open-chain and cyclic dihydrocarbyl ethers are dimethyl ether, chloromethyl methyl ether, bis (chloromethyl) ether, diethyl ether, chloromethyl ethyl ether, 2-chloroethyl ethyl ether, bis (2-chloroethyl) ether, di-n-propyl ether, diisopropyl ether, di-n-butyl ether, di-sec-butyl ether, diisobutyl ether, di-n-pentyl ether, di-n-hexyl ether, di-n-heptyl ether, di-n-octyl ether, di-(2-ethylhexyl) ether, methyl n-butyl ether, methyl sec-butyl ether, methyl isobutyl ether, methyl tert-butyl ether, ethyl n-butyl ether, ethyl sec-butyl ether, ethyl isobutyl ether, ethyl tert-butyl ether, n-propyl-n-butyl ether, n-propyl sec-butyl ether, n-propyl isobutyl ether, n-propyl tert-butyl ether, isopropyl n-butyl ether, isopropyl sec-butyl ether, isopropyl isobutyl ether, isopropyl tert-butyl ether, methyl n-hexyl ether, methyl n-octyl ether, methyl 2-ethylhexyl ether, ethyl n-hexyl ether, ethyl n-octyl ether, ethyl 2-ethylhexyl ether, n-butyl n-octyl ether, n-butyl 2-ethylhexyl ether, tetrahydrofuran, tetrahydropyran, 1,2-, 1,3- and 1,4-dioxane, dicyclohexyl ether, diphenyl ether, alkyl aryl ethers, such as anisole and phenetole, ditolyl ether, dixylyl ether and dibenzyl ether.

Furthermore, difunctional ethers such as dialkoxybenzenes, preferably dimethoxybenzenes, very preferably veratrol, and ethylene glycol dialkylethers, preferably ethylene glycol dimethylether and ethylene glycol diethylether, are preferred.

Among the dihydrocarbyl ethers mentioned, diethyl ether, 2-chloroethyl ethyl ether, diisopropyl ether, di-n-butyl ether and diphenyl ether have been found to be particularly advantageous as donors for the aluminum trihalide-donor complexes or the alkylaluminum halide complexes or the iron trihalide-donor complexes or the gallium trihalide-donor complex or the titanium tetrahalide-donor complex or the zinc dihalide-donor complex or the tin dihalide-donor complex or the tin tetrahalide-donor complex, very preferably the aluminum trihalide-donor complexes or iron trihalide-donor complexes and especially the aluminum trihalide-donor complexes.

In a peferred embodiment dihydrocarbyl ethers with at least one secondary or tertiary dihydrocarbyl group are preferred over dihydrocarbyl groups with primary groups only. Ethers with primary dihydrocarbyl groups are those ethers in which both dihydrocarbyl groups are bound to the ether functional group with a primary carbon atom, whereas ethers with at least one secondary or tertary dihydrocarbyl group are those ethers in which at least one dihydrocarbyl group is bound to the ether functional group with a secondary or tertiary carbon atom.

For the sake of clarity, e.g. diisobutyl ether is deemed to be an ether with primary dihydrocarbyl groups, since the secondary carbon atom of the isobutyl group is not bound to the oxygen of the functional ether group but the hydrocarbyl group is bound via a primary carbon atom.

Preferred examples for ethers with primary dihydrocarbyl groups are diethyl ether, di-n-butyl ether, and di-n-propyl ether.

Preferred examples for ethers with at least one secondary or tertary dihydrocarbyl group are diisopropyl ether, methyl tert-butyl ether, ethyl tert-butyl ether, and anisole.

In addition, particularly advantageous dihydrocarbyl ethers as donors for the aluminum trihalide-donor complexes or the alkylaluminum halide complexes, have been found to be those in which the donor compound has a total carbon number of 3 to 16, preferably of 4 to 16, especially of 4 to 12, in particular of 4 to 8.

In another preferred embodiment halide-substituted ethers are preferred in combination with aluminum halide-donor complex or iron halide-donor complex.

Organic compounds with at least one carboxylic ester function are preferably hydrocarbyl carboxylates of the general formula $R^{10}$—$COOR^{11}$ in which the variables $R^{10}$ and $R^{11}$ are each independently $C_1$- to $C_{20}$-alkyl radicals, especially $C_1$- to $C_8$ alkyl radicals, $C_5$- to $C_8$-cycloalkyl radicals, $C_6$- to $C_{20}$-aryl radicals, especially $C_6$- to $C_{12}$ aryl radicals, or $C_7$- to $C_{20}$-arylalkyl radicals, especially $C_7$- to $C_{12}$-arylalkyl radicals.

Examples of the hydrocarbyl carboxylates mentioned are methyl formate, ethyl formate, n-propyl formate, isopropyl formate, n-butyl formate, sec-butyl formate, isobutyl formate, tert-butyl formate, methyl acetate, ethyl acetate, n-propyl acetate, isopropyl acetate, n-butyl acetate, sec-butyl acetate, isobutyl acetate, tert-butyl acetate, methyl propionate, ethyl propionate, n-propyl propionate, isopropyl propionate, n-butyl propionate, sec-butyl propionate, isobutyl propionate, tert-butyl propionate, methyl butyrate, ethyl butyrate, n-propyl butyrate, isopropyl butyrate, n-butyl butyrate, sec-butyl butyrate, isobutyl butyrate, tert-butyl butyrate, methyl cyclohexanecarboxylate, ethyl cyclohexanecarboxylate, n-propyl cyclohexanecarboxylate, isopropyl cyclohexanecarboxylate, n-butyl cyclohexanecarboxylate, sec-butyl cyclohexanecarboxylate, isobutyl cyclohexanecarboxylate, tert-butyl cyclohexanecarboxylate, methyl benzoate, ethyl benzoate, n-propyl benzoate, isopropyl benzoate, n-butyl benzoate, sec-butyl benzoate, isobutyl benzoate, tert-butyl benzoate, methyl phenylacetate, ethyl phenylacetate, n-propyl phenylacetate, isopropyl phenylacetate, n-butyl phenylacetate, sec-butyl phenylacetate, isobutyl phenylacetate and tert-butyl phenylacetate. Among the hydrocarbyl carboxylates mentioned, ethyl acetate has been found to be particularly advantageous as a donor for the complexes.

In addition, particularly advantageous hydrocarbyl carboxylates as donors, have been found to be those in which the donor compound has a total carbon number of 3 to 16, preferably of 4 to 16, especially of 4 to 12, in particular of 4 to 8, preference is given in particular to those having a total of 3 to 10 and especially 4 to 6 carbon atoms.

Organic compounds with at least one aldehyde function, preferably exactly one aldehyde function and organic compounds with at least one keto function, preferably exactly one keto function typically have from 1 to 20, preferably from 2 to 10 carbon atoms. Functional groups other than the carbonyl group are preferably absent.

Preferred organic compounds with at least one aldehyde function are those of formula $R^{10}$—CHO, in which $R^{10}$ has the above-mentioned meaning, very preferably are selected from the group consisting of formaldehyde, acetaldehyde, propionaldehyde, n-butyraldehyde, isobutyraldehyde, and benzaldehyde.

Preferred organic compounds with at least one keto function are those of formula $R^{10}$—(C=O)—$R^{11}$, in which $R^{10}$ and $R^{11}$ have the above-mentioned meaning, very preferably are selected from the group consisting of acetone, methyl ethyl ketone, diethyl ketone, methyl isobutyl ketone, cyclohexanone, acetophenone, and benzophenone. Greatest preference is given to acetone.

Organic compounds with at least one nitrogen containing heterocyclic ring are preferably saturated, partly unsaturated or unsaturated nitrogen-containing five-membered or six-membered heterocyclic rings which comprises one, two or three ring nitrogen atoms and may have one or two further ring heteroatoms from the group of oxygen and sulfur and/or hydrocarbyl radicals, especially $C_1$- to $C_4$-alkyl radicals and/or phenyl, and/or functional groups or heteroatoms as substituents, especially fluorine, chlorine, bromine, nitro and/or cyano, for example pyrrolidine, pyrrole, imidazole, 1,2,3- or 1,2,4-triazole, oxazole, thiazole, piperidine, pyrazane, pyrazole, pyridazine, pyrimidine, pyrazine, 1,2,3-, 1,2,4- or 1,2,5-triazine, 1,2,5-oxathiazine, 2H-1,3,5-thiadiazine or morpholine.

However, a very particularly suitable nitrogen-containing basic compound of this kind is pyridine or a derivative of pyridine (especially a mono-, di- or tri-$C_1$- to $C_4$-alkyl-substituted pyridine) such as 2-, 3-, or 4-methylpyridine (picolines), 2,3-, 2,4-, 2,5-, 2,6-, 3,4-, 3,5- or 3,6-dimethylpyridine (lutidines), 2,4,6-trimethylpyridine (collidine), 2-, 3,- or 4-tert-butylpyridine, 2-tert-butyl-6-methylpyridine, 2,4-, 2,5-, 2,6- or 3,5-di-tert-butylpyridine or else 2-, 3,- or 4-phenylpyridine.

The organic radicals for the variables $R^a$ to $R^e$ in the imidazolium salts of the general formula (I) comprise preferably 1 to 1000, especially 1 to 500 and in particular 1 to 250 carbon atoms. In general, these organic radicals are low molecular weight radicals, for example alkyl, cycloalkyl, alkenyl, cycloalkenyl, aryl or heteroaryl radicals, or polymeric radicals, for example polypropyl radicals or especially polyisobutyl radicals. In a preferred embodiment low molecular weight radicals comprise preferably 1 to 20 carbon atoms.

Useful organic radicals having 1 to 3000 carbon atoms for the variables $R^a$ to $R^e$ in the imidazolium salts of the general formula (I) preferably include $C_1$- to $C_{20}$-alkyl radicals, especially $C_1$- to $C_{12}$-alkyl radicals, in particular $C_1$- to $C_8$-alkyl radicals, and the aryl-, heteroaryl-, cycloalkyl-, halogen-, hydroxy-, amino-, carboxy-, formyl-, —O—, —CO—, —CO—O— or —CO—N<-substituted components thereof, for example methyl, ethyl, 1-propyl, 2-propyl, 1-butyl, 2-butyl, 2-methyl-1-propyl (isobutyl), 2-methyl-2-propyl (tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, n-heptyl, n-octyl, 2-ethylhexyl, n-nonyl, n-decyl, 2-propylheptyl, n-undecyl, n-dodecyl, n-tridecyl, isotridecyl, n-tetradecyl, n-pentadecyl, n-hexadecyl, n-heptadecyl, n-octadecyl, n-nonadecyl, n-eicosyl, phenylmethyl (benzyl), diphenylmethyl, triphenylmethyl, 2-phenylethyl, 3-phenylpropyl, cyclopentylmethyl, 2-cyclopentylethyl, 3-cyclopentylpropyl, cyclohexylmethyl, 2-cyclohexylethyl, 3-cyclohexylpropyl, methoxy, ethoxy, formyl, acetyl, and also fluoroalkyl radicals such as monofluoromethyl, difluoromethyl, trifluoromethyl, pentafluoroethyl, 3,3,3-trifluoropropyl, perfluorohexyl, perfluorooctyl, perfluorodecyl or perfluorododecyl.

Further suitable organic radicals having 1 to 20 carbon atoms for variables $R^a$ to $R^e$ in the imidazolium salts of the general formula (I) are also $C_3$- to $C_{12}$-cycloalkyl radicals, especially $C_5$- to $C_7$-cycloalkyl radicals, and the aryl-, heteroaryl-, cycloalkyl-, halogen-, hydroxy-, amino-, carboxy-, formyl-, —O—, —CO— or —CO—O-substituted components thereof, for example cyclopentyl, 2-methyl-1-cyclopentyl, 3-methyl-1-cyclopentyl, cyclohexyl, 2-methyl-1-cyclohexyl, 3-methyl-1-cyclohexyl, 4-methyl-1-cyclohexyl, and also fluorocyclohexyl radicals such as perfluorocyclohexyl.

Further suitable organic radicals having 1 to 20 carbon atoms for variables $R^a$ to $R^e$ in the imidazolium salts of the general formula (I) are also $C_2$- to $C_{20}$-alkenyl radicals, especially $C_3$- to $C_8$-alkenyl radicals, and the aryl-, heteroaryl-, cycloalkyl-, halogen-, hydroxy-, amino-, carboxy-, formyl-, —O—, —CO— or —CO—O-substituted components thereof, for example vinyl, 2-propenyl (allyl), 3-butenyl, cis-2-butenyl, trans-2-butenyl, and also fluoroalkenyl radicals such as perfluoro-2-propenyl, perfluoro-3-butenyl or perfluoro-2-butenyls.

Further suitable organic radicals having 1 to 20 carbon atoms for variables $R^a$ to $R^e$ in the imidazolium salts of the general formula (I) are also $C_3$- to $C_{12}$-cycloalkenyl radicals, especially $C_5$- to $C_7$-cycloalkenyl radicals, and the aryl-, heteroaryl-, cycloalkyl-, halogen-, hydroxy-, amino-, carboxy-, formyl-, —O—, —CO— or —CO—O-substituted components thereof, for example 3-cyclopentenyl, 2-cyclohexenyl, 3-cyclohexenyl, 2,5-cyclohexadienyl, and also fluorocycloalkenyl radicals such as fluorocyclohexenyl radicals.

Further suitable organic radicals having 1 to 20 carbon atoms for variables $R^a$ to $R^e$ in the imidazolium salts of the general formula (I) are also aryl or heteroaryl radicals having 3 to 20 and especially 5 to 10 carbon atoms and the alkyl-, aryl-, heteroaryl-, cycloalkyl-, halogen-, hydroxy-, amino-, carboxy-, formyl-, —O—, —CO— or —CO—O-substituted components thereof, for example phenyl, 2-methylphenyl (2-tolyl), 3-methylphenyl (3-tolyl), 4-methylphenyl (4-tolyl), 2-ethylphenyl, 3-ethylphenyl, 4-ethylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 4-phenylphenyl, 1-naphthyl, 2-naphthyl, 1-pyrrolyl, 2-pyrrolyl, 3-pyrrolyl, 2-pyridinyl, 3-pyridinyl, 4-pyridinyl, and also fluoroaryl or fluoroheteroaryl radicals such as mono-, di-, tri-, tetra- or pentafluorophenyl.

It is also possible for two adjacent radicals of the variables $R^a$ to $R^e$ to form an unsaturated, saturated or aromatic ring which may optionally be substituted by functional groups, aryl, alkyl, aryloxy, alkyloxy, halogen, heteroatoms and/or heterocycles and may optionally be interrupted by one or more oxygen and/or sulfur atoms and/or one or more substituted or unsubstituted imino groups.

The organic radicals having 1 to 3000 carbon atoms for the variables $R^a$ to $R^e$ may be synthetic radicals or—especially in the case of alkyl and alkenyl radicals—radicals based on naturally occurring compounds. The latter derive particularly from naturally occurring glycerides or fatty acids, for example from stearic acid, palmitic acid, oleic acid, linoleic acid, linolenic acid or tallow fatty acid. Such radicals based on naturally occurring compounds are often mixtures of different, usually homologous alkyl or alkenyl radicals.

Further preferred organic radicals having 1 to 3000 carbon atoms for the variables $R^a$ to $R^e$ in the imidazolium salts of the general formula (I) also include polyisobutyl radicals having 16 to 3000, especially having 20 to 1000, in particular having 25 to 500 and most preferably having 30 to 250 carbon atoms. Such polyisobutyl radicals have number-average molecular weights $M_n$, determined by gel permeation chromatography, of 200 to 40 000, preferably of 500 to 15 000, especially of 700 to 7000, in particular of 900 to 3000 and most preferably of 900 to 1100. The polyisobutyl radicals may be joined to the imidazolium ring directly or by a methylene group (—$CH_2$—).

The organic radicals having 1 to 3000 carbon atoms for the variables $R^a$ to $R^e$, especially the alkyl, cycloalkyl, alkenyl, cycloalkenyl, aryl and heteroaryl radicals mentioned, and also the polymeric radicals mentioned, may comprise one or more heteroatoms in their skeletons, such as oxygen atoms, sulfur atoms, or nitrogen atoms optionally substituted by further, usually low molecular weight organic radicals, or bear one or more substituents or one or more functional groups, for example hydroxyl groups, halogen atoms such as fluorine, chlorine or bromine, pseudohalide groups such as thiocyanato or dicyanamido, cyano groups, nitro groups, sulfo groups, sulfonic acid groups, sulfonic ester groups, sulfonamide groups, amino groups, carboxylic acid groups, carboxylic ester groups or carboxamide groups.

In general, imidazolium salts of the general formula (I) in which the variables $R^a$ and $R^c$ each have the above definitions of an organic radical having 1 to 3000 carbon atoms and the variables $R^b$, $R^d$ and $R^e$ are each hydrogen are used.

In a more preferred embodiment of the present invention, imidazolium salts of the general formula (I) in which the variables $R^a$ to $R^e$ are each independently $C_1$- to $C_{20}$-alkyl groups and the variables $R^b$, $R_d$ and $R^e$ additionally each may be hydrogen are used.

In a more preferred embodiment of the present invention, imidazolium salts of the general formula (I) in which the variables $R^a$ and $R^c$ are each independently $C_1$- to $C_{20}$-alkyl groups and the variables $R^b$, $R^d$ and $R^e$ are each hydrogen are used. These $C_1$- to $C_{20}$-alkyl groups are preferably pure hydrocarbyl radicals. Preferably $R^a$ and $R^c$ are each independently $C_1$- to $C_{12}$-alkyl groups, very preferably $C_1$- to $C_8$-alkyl groups, and especially $C_1$- to $C_4$-alkyl groups.

Typical examples for $R^a$ and $R^c$ are methyl, ethyl, n-propyl, isopropyl, n-butyl, tert-butyl, pentyl, n-hexyl, 2-methylpentyl, n-heptyl, n-octyl, 2-ethylhexyl, n-decyl, n-dodecyl, tallow fatty alkyl radicals, and n-eicosyl. Preferably $R^a$ and $R^c$ are independently of another selected from the group consisting of methyl, ethyl, n-propyl, isopropyl, n-butyl, n-hexyl, n-octyl, 2-ethylhexyl, n-decyl, and n-dodecyl, very preferably $R^a$ and $R^c$ are independently of another selected from the group consisting of methyl, ethyl, n-butyl, n-hexyl, n-octyl and 2-ethylhexyl, and especially selected from the group consisting of methyl, ethyl, and n-butyl.

Useful anions, especially anions X in the imidazolium salts of the general formula (I) include, for example: fluoride, chloride; bromide, iodide; thiocyanate; hexafluorophosphate; trifluoromethanesulfonate; methanesulfonate; carboxylates, especially formate, acetate, propionate, butyrate or benzoate; mandelate; nitrate; nitrite; trifluoroacetate; sulfate; hydrogensulfate; methylsulfate; ethylsulfate; 1-propylsulfate; 1-butylsulfate; 1-hexylsulfate; 1-octylsulfate; sulfite; hydrogensulfite; phosphate; dihydrogenphosphate; hydrogenphosphate; $C_1$-$C_4$-dialkylphosphates; carbonate $CO_3^{2-}$, hydrogencarbonate $HCO_3^-$; propionate; tetrachloroaluminate; $Al_2Cl_7^-$; $Al_3Cl_{10}^-$; chlorozincate; chloroferrate; chlorocuprate $CuCl_2^-$, bis(trifluoromethylsulfonyl)imide; bis(pentafluoroethylsulfonyl)imide; bis(methylsulfonyl)imide; bis(p-tolylsulfonyl)imide; tris(trifluoromethylsulfonyl)methide; bis(pentafluoroethylsulfonyl) methide; p-tolylsulfonate; tetracarbonylcobaltate; dimethyleneglycolmonomethylethersulfate; oleate; stearate; acrylate; methacrylate; maleate; hydrogencitrate; vinylphosphonate; bis(pentafluoroethyl)phosphinate; borates such as bis[salicylato(2-)]borate, bis[oxalato(2-)]borate, bis[1,2-benzenediolato(2-)—O,O']borate, tetracyanoborate or tetrafluoroborate; dicyanamide; tris(pentafluoroethyl)trifluorophosphate; tris(heptafluoropropyl)trifluorophosphate, cyclic arylphosphates such as pyrocatechol phosphate of the formula $(C_6H_4O_2)P(O)O—$; chlorocobaltate.

In general, the anions, especially anions X are selected from the following group:
alkylsulfates of the formula $R^aOSO_3^-$ where $R^a$ is a $C_1$- to $C_{12}$-alkyl group, preferably a $C_1$- to $C_8$-alkyl group;
the alkylsulfonates of the formula $R^aSC_3^-$ where $R^a$ is a $C_1$- to $C_{12}$-alkyl group, preferably a $C_1$- to $C_8$-alkyl group;
halides, especially chloride and bromide;
pseudohalides, especially thiocyanate and dicyanamide;
carboxylates of the formula $R^aCOO^-$ where $R^a$ is a $C_1$- to $C_{60}$-alkyl group, a $C_2$- to $C_{60}$-alkenyl group, a $C_6$- to $C_{60}$-aryl group or a $C_7$- to $C_{60}$-alkylaryl or -arylalkyl group, preferably a $C_r$ to $C_{20}$-alkyl group, a $C_2$- to $C_{20}$-alkenyl group, a $C_6$- to $C_{20}$-aryl group or a $C_7$- to $C_{20}$-alkylaryl or arylalkyl group, in particular a $C_2$- to $C_8$-alkenyl group, a $C_8$- to $C_{12}$-aryl group or a $C_7$- to $C_{14}$-alkylaryl or -arylalkyl group, especially acetate, but also formate, propionate, butyrate, acrylate, methacrylate, benzoate, phenylacetate or o-, m- or p-methylbenzoate;
polycarboxylates of the formula $R^b(COO^-)_n$ where n is the number 1, 2 or 3 and Rn is an n-valent hydrocarbyl radical having 1 to 60, especially 1 to 20 and in particular 1 to 14 carbon atoms; typical radicals of this kind are malonate, succinate, glutarate, adipate, phthalate or terephthalate; a further suitable polycarboxylate anion is also the oxalate anion $^-OOC—COO^-$;
phosphates, especially dialkylphosphates of the formula RaRbPar where $R^a$ and $R^b$ are each independently a $C_1$- to $C_6$-alkyl group; more particularly, $R^a$ and $R^b$ are each the same alkyl group as in dimethylphosphate and diethylphosphate;
phosphonates, especially monoalkyl phosphonates of the formula $R^aR^bPO_3^-$ where $R^a$ and $R^b$ are each independently a $C_1$- to $C_6$-alkyl group;
the TFSI anion of the formula $N(SO_2CF_3)_2^-$;
tricyanomethanide of the formula $(CN)_3\ C^-$.

Frequently selected anions X are chloride, bromide, hydrogensulfate, tetrachloroaluminate, thiocyanate, dicyanamide, methylsulfate, ethylsulfate, methanesulfonate, formate, acetate, dimethylphosphate, diethylphosphate, p-tolylsulfonate, tetrafluoroborate, hexafluorophosphate, methylmethylphosphonate, methylphosphonate, the TFSI anion, tricyanomethanide and trifluoromethanesulfonate.

In a preferred embodiment of the present invention, imidazolium salts of the general formula (I) in which the anion X denotes sulfate, an alkylsulfate, an alkylsulfonate, an alkylcarbonate, a halide, a pseudohalide, a carboxylate, a phosphate, a phosphonate, nitrate, nitrite, the TFSI anion of the formula $N(SO_2CF_3)_2^-$ or the tricyanomethanide anion are used. The anion X is most preferably a halide, an alkylcarbonate, a pseudohalide, a carboxylate or the tricyanomethanide anion. It is frequently also advantageous when the anion X does not comprise any phosphorus atom, any sulfur atom, any halogen atom and/or any boron atom. Especially the anion X is chloride.

The charge n of the anion X depends on its nature and may assume the value of 1, 2 or 3. n is most frequently 1 or 2, especially 1.

Typical individual examples of imidazolium salts (I) are 1,3-dimethylimidazolium chloride, 1,3-diethylimidazolium chloride, 1-ethyl-3-methylimidazolium chloride, 1-propyl-3-methylimidazolium chloride, 1-butyl-3-methylimidazolium chloride, 1-pentyl-3-methylimidazolium chloride, 1-hexyl-3-methylimidazolium chloride, 1-octyl-3-methylimidazolium chloride, 1-(2-ethylhexyl)-3-methylimidazolium chloride, 1,3-di(2-ethylhexyl)imidazolium chloride, 1-decyl-3-methylimidazolium chloride, 1-(2-propylheptyl)-3-methylimidazolium chloride, 1,3,4,5-tetramethylimidazolium chloride, 1,3-dimethyl-4,5-diphenylimidazolium chloride, 1,4,5-trimethyl-3-ethylimidazolium chloride, 1-methyl-3-ethyl-4,5-diphenylimidazolium chloride, 1,3-dimethylimidazolium acetate, 1,3-diethylimidazolium acetate, 1-ethyl-3-methylimidazolium acetate, 1-propyl-3-methylimidazolium acetate, 1-butyl-3-methylimidazolium acetate, 1-pentyl-3-methylimidazolium acetate, 1-hexyl-3-methylimidazolium acetate, 1-octyl-3-methylimidazolium acetate, 1-(2-ethylhexyl)-3-methylimidazolium acetate, 1,3-di(2-ethylhexyl)imidazolium acetate, 1-decyl-3-methylimidazolium acetate, 1-(2-propylheptyl)-3-methylimidazolium acetate, 1,3,4,5-tetramethylimidazolium acetate, 1,3-dimethyl-4,5-diphenylimidazolium acetate, 1,4,5-trimethyl-3-ethylimidazolium acetate, 1-methyl-3-ethyl-4,5-diphenylimidazolium acetate, 1,3-imethylimidazolium methylcarbonate, 1,3-diethylimidazolium methylcarbonate, 1-ethyl-3-methylimidazolium methylcarbonate, 1-propyl-3-methylimidazolium methylcarbonate, 1-butyl-3-methylimidazolium methylcarbonate, 1-pentyl-3-methylimidazolium methylcarbonate, 1-hexyl-3-methylimidazolium methylcarbonate, 1-octyl-3-methylimidazolium methylcarbonate, 1-(2-ethylhexyl)-3-methylimidazolium methylcarbonate, 1,3-di(2-ethylhexyl)imidazolium methylcarbonate, 1-decyl-3-methylimidazolium methylcarbonate, 1-(2-propylheptyl)-3-methylimidazolium methylcarbonate, 1,3,4,5-tetramethylimidazolium methylcarbonate, 1,3-dimethyl-4,5-diphenylimidazolium methylcarbonate, 1,4,5-trimethyl-3-ethylimidazolium methylcarbonate, 1-methyl-3-ethyl-4,5-diphenylimidazolium methylcarbonate, 1,3-dimethylimidazolium methylsulfate, 1,3-diethylimidazolium methylsulfate, 1-ethyl-3-methylimidazolium methylsulfate, 1-propyl-3-methylimidazolium methylsulfate, 1-butyl-3-methylimidazolium methylsulfate, 1-pentyl-3-methylimidazolium methylsulfate, 1-hexyl-3-methylimidazolium methylsulfate, 1-octyl-3-methylimidazolium methylsulfate, 1-(2-ethylhexyl)-3-methylimidazolium methylsulfate, 1,3-di(2-ethylhexyl) imidazolium methylsulfate, 1-decyl-3-methylimidazolium methylsulfate, 1-(2-propylheptyl)-3-methylimidazolium methylsulfate, 1,3,4,5-tetramethylimidazolium methylsulfate, 1,3-dimethyl-4,5-diphenylimidazolium methylsulfate, 1,4,5-trimethyl-3-ethylimidazolium methylsulfate, 1-methyl-3-ethyl-4,5-diphenylimidazolium methylsulfate, 1,3-dimethylimidazolium methylsulfonate, 1,3-diethylimidazolium methylsulfonate, 1-ethyl-3-methylimidazolium methylsulfonate, 1-propyl-3-methylimidazolium methylsulfonate, 1-butyl-3-methylimidazolium methylsulfonate, 1-pentyl-3-methylimidazolium methylsulfonate, 1-hexyl-3-methylimidazolium methylsulfonate, 1-octyl-3-methylimidazolium methylsulfonate, 1-(2-ethylhexyl)-3-methylimidazolium methylsulfonate, 1,3-di(2-ethylhexyl)imidazolium methylsulfonate, 1-decyl-3-methylimidazolium methylsulfonate, 1-(2-propylheptyl)-3-methylimidazolium methylsulfonate, 1,3,4,5-tetramethylimidazolium methylsulfonate, 1,3-dimethyl-4,5-diphenylimidazolium methylsulfonate, 1,4,5-trimethyl-3-ethylimidazolium methylsulfonate, 1-methyl-3-ethyl-4,5-diphenylimidazolium methylsulfonate, 1,3-dimethylimidazolium diethylphosphate, 1,3-diethylimidazolium diethylphosphate, 1-ethyl-3-methylimidazolium diethylphosphate, 1-propyl-3-methylimidazolium diethylphosphate, 1-butyl-3-methylimidazolium diethylphosphate, 1-pentyl-3-methylimidazolium diethylphosphate, 1-hexyl-3-methylimidazolium diethylphosphate, 1-octyl-3-methylimidazolium diethylphosphate, 1-(2-ethylhexyl)-3-methylimidazolium diethylphosphate, 1,3-di(2-ethylhexyl)imidazolium diethylphosphate, 1-decyl-3-methylimidazolium diethylphosphate, 1-(2-propylheptyl)-3-methylimidazolium diethylphosphate, 1,3,4,5-tetramethylimidazolium diethylphosphate, 1,3-dimethyl-4,5-diphenylimidazolium diethylphosphate, 1,4,5-trimethyl-3-ethylimidazolium diethylphosphate and 1-methyl-3-ethyl-4,5-diphenylimidazolium diethylphosphate.

Preferred individual examples of imidazolium salts (I) with polyisobutenyl radicals are 1,3-dimethylimidazolium chloride, 1,3-diethylimidazolium chloride, 1-ethyl-3-methylimidazolium chloride, 1-propyl-3-methylimidazolium chloride, 1-butyl-3-methylimidazolium chloride, 1-pentyl-3-methylimidazolium chloride, 1-hexyl-3-methylimidazolium chloride, 1-octyl-3-methylimidazolium chloride, 1-(2-ethylhexyl)-3-methylimidazolium chloride, 1,3-di(2-ethylhexyl)imidazolium chloride, 1-decyl-3-methylimidazolium chloride, 1-(2-propylheptyl)-3-methylimidazolium chloride, 1,3,4,5-tetramethylimidazolium chloride, 1,3-dimethyl-4,5-diphenylimidazolium chloride, 1,4,5-trimethyl-3-ethylimidazolium chloride, 1-methyl-3-ethyl-4,5-diphenylimidazolium chloride, 1-polyisobutyl-3-methylimidazolium acetate, 1-polyisobutyl-3-ethylimidazolium acetate, 1-polyisobutyl-3-propylimidazoliurn acetate, 1-polyisobutyl-3-butylimidazolium acetate, 1-polyisobutyl-3-(2-ethylhexyhimidazolium acetate, 1,3-di(polyisobutyl) imidazolium acetate, 1-polyisobutyl-3-methylimidazolium methylcarbonate, 1-polyisobutyl-3-ethylimidazolium methylcarbonate, 1-polyisobutyl-3-propylimidazolium methylcarbonate, 1-polyisobutyl-3-butylimidazolium methylcarbonate, 1-polyisobutyl-3-(2-ethylhexyl)imidazolium methylcarbonate, 1,3-di(polyisobutyl)imidazolium methylcarbonate, 1-polyisobutyl-3-methylimidazolium thiocyanate, 1-polyisobutyl-3-ethylimidazolium thiocyanate, 1-polyisobutyl-3-propylimidazolium thiocyanate, 1-polyisobutyl-3-butylimidazolium thiocyanate, 1-polyisobutyl-3-(2-ethylhexyl)imidazolium thiocyanate, 1,3-di(polyisobutyl)imidazolium thiocyanate, 1-polyisobutyl-3-methylimidazolium tricyanomethanide, 1-polyisobutyl-3-ethylimidazolium tricyanomethanide, 1-polyisobutyl-3-propylimidazolium tricyanomethanide, 1-polyisobutyl-3-butylimidazolium tricyanomethanide, 1-polyisobutyl-3-(2-ethylhexyl)imidazolium tricyanomethanide and 1,3-di(polyisobutyl)imidazolium tricyanomethanide.

Very preferred individual examples of imidazolium salts (I) with polyisobutenyl radicals are 1,3-dimethylimidazolium chloride, 1,3-diethylimidazolium chloride, 1-ethyl-3-methylimidazolium chloride, 1-propyl-3-methylimidazolium chloride, 1-butyl-3-methylimidazolium chloride, 1-pentyl-3-methylimidazolium chloride, 1-hexyl-3-methylimidazolium chloride, 1-octyl-3-methylimidazolium chloride, 1-(2-ethylhexyl)-3-methylimidazolium chloride, 1,3-di(2-ethylhexyl)imidazolium chloride, 1-decyl-3-methylimidazolium chloride, 1-(2-propylheptyl)-3-methylimidazolium chloride, 1,3,4,5-tetramethylimidazolium chloride, 1,3-dimethyl-4,5-diphenylimidazolium chloride, 1,4,5-trimethyl-3-ethylimidazolium chloride, 1-methyl-3-ethyl-4,5-diphenylimidazolium chloride, 1-polyisobutyl-3-methylimidazolium acetate, 1-polyisobutyl-3-ethylimidazolium acetate, 1-polyisobutyl-3-propylimidazoliurn acetate, 1-polyisobutyl-3-butylimidazolium acetate, 1-polyisobutyl-3-(2-ethylhexyhimidazolium acetate, and 1,3-di(polyisobutyl) imidazolium acetate, especially 1,3-dimethylimidazolium chloride, 1,3-diethylimidazolium chloride, 1-ethyl-3-methylimidazolium chloride, 1-propyl-3-methylimidazolium chloride, 1-butyl-3-methylimidazolium chloride, 1-pentyl-3-methylimidazolium chloride, 1-hexyl-3-methylimidazolium chloride, 1-octyl-3-methylimidazolium chloride, 1-(2-ethylhexyl)-3-methylimidazolium chloride, 1,3-di(2-ethylhexyl)imidazolium chloride, 1-decyl-3-methylimidazolium chloride, 1-(2-propylheptyl)-3-methylimidazolium chloride, 1,3,4,5-tetramethylimidazolium chloride, 1,3-dimethyl-4,5-diphenylimidazolium chloride, 1,4,5-trimethyl-3-ethylimidazolium chloride, 1-methyl-3-ethyl-4,5-diphenylimidazolium chloride.

Imidazolium salts of the (I) type with low molecular weight radicals are sold commercially under the Basionics™ name by BASF SE.

The preparation of the imidazolium salts of the (I) type is familiar to the person skilled in the art.

A typical synthesis route proceeds from imidazole formation from 1 mol of a 1,2-dicarbonyl compound, 1 mol of an appropriately substituted primary amine, 1 mol of ammonia and 1 mol of an aldehyde, conducts an N-alkylation with a suitable alkylating agent and then, if desired, exchanges the anion. For example, glyoxal or benzil, a low molecular weight primary alkylamine or alkenylamine, for example a $C_1$- to $C_{13}$-alkylamine, or a polyisobutylamine, ammonia and formaldehyde are used to prepare an N-alkyl-4,5-diphenylimidazole or an N-alkylimidazole or an N-polyisobutyl-4,5-diphenylimidazole or an N-polyisobutylimidazole, and the unsubstituted second nitrogen atom is alkylated with an epoxide such as ethylene oxide, propylene oxide, butylene oxide or styrene oxide in the presence of acetic acid, or with a dialkyl carbonate, in which case the imidazolium salt has an acetate anion or an alkylcarbonate anion. To introduce a polyisobutyl radical on the unsubstituted second nitrogen atom, can with a polyisobutene epoxide as the alkylating agent be used.

In the preparation of imidazolium salts of the (I) type with the same variables $R^a$ and $R^c$, 1 mol of a 1,2-dicarbonyl compound is advantageously used together with 2 mol of an appropriately substituted primary amine and 1 mol of an aldehyde, optionally in the presence of a suitable solvent (for example of acetic acid and water when an imidazolium acetate is to be obtained) in a one-stage synthesis, usually at 20 to 120° C., especially at 25 to 80° C.

The molar ratio of the donor compounds (calculated as the sum of compound (II), preferably sum of ethers plus the sum of compounds of formula (Ia) to (Iw) in the mixture) mentioned to the aluminum trihalide or to the alkylaluminum halide or to the iron trihalide or to the gallium trihalide or to the titanium tetrahalide or to the zinc dihalide or to the tin dihalide or to the tin tetrahalide, in the donor complex generally varies within the range from 0.4:1 to 2.0:1, especially from 0.5:1 to 1.8:1, in particular 0.7:1 to 1.6:1; in most cases it is 0.9:1 to 1.5:1. However, it is also possible to work with a greater excess of the donor compounds, often up to a 10-fold and especially 3-fold molar excess; the excess amount of donor compounds then additionally acts as a solvent or diluent.

The molar ratio of compound (II), preferably the ether compounds (calculated as the sum of compounds (II) respectively the sum of ethers) to the compounds of formula (Ia) to (Iw) (calculated as the sum of compounds of formula (Ia) to (Iw)) in the mixture generally varies from 0.1:1 to 1:0.1, preferably from 0.2:1 to 1:0.2, very preferably from 0.25:1 to 1:0.5, more preferably from 0.3:1 to 1:0.66, especially from 0.3:1 to 1:1, and even from 0.35:1 to 1:1. In a preferable embodiment the compounds (II) respectively the ethers are present in an equimolar molar ratio.

The molar ratio of the Lewis Acid mentioned, preferably the aluminum trihalide or alkylaluminum halide mentioned to the isobutene monomer used in the case of homopolymerization of isobutene, or to the total amount of the polymerizable monomers used in the case of copolymerization of isobutene, based on each individual functional site of the Lewis Acid mentioned, preferably the aluminum trihalide or alkylaluminum halide, is generally from 0.001:1 to 0.2:1, preferably 0.002:1 to 0.1:1, very preferably 0.003:1 to 0.08:1, especially 0.005:1 to 0.05:1, and in particular 0.007:1 to 0.03:1.

Typically, the Lewis Acid-donor complex, preferably the aluminum trihalide-donor complex or the alkylaluminum halide complex, especially the alkyl aluminum dichloride-donor complex or dialkyl aluminum chloride-donor complex, is prepared separately prior to the polymerization from the respective metal halides, preferably the aluminum trihalide or the alkylaluminum halide, especially from anhydrous alkyl aluminum dichloride or an dialkyl aluminum chloride, and the donor compound, and is then—usually dissolved in an inert solvent such as a halogenated hydrocarbon, for example dichloromethane, or more preferably in unhalogenated hydrocarbons—added to the polymerization medium. However, in a less preferred embodiment the complex can also be prepared in situ prior to the polymerization.

In case the polymerization catalyst is not fully soluble in the solvent used it may be advantageous to disperse the polymerization catalyst in the inert solvent, e.g. by vigorously stirring the dispersion. The dispersing can be effected in any apparatus suitable for dispersing. Shaking apparatuses such as for example from Skandex may be mentioned by way of example or for example in ultrasonic apparatuses, high pressure homogenizers, 2-, 3-, 4- or 5-roll mills, minimills, Henschel mixers, shaking mills, Ang mills, gear mills, bead mills, wet mills, sand mills, attritors, colloid mills, ultrasonic homogenizers, with Ultra Turrax stirrer and in particular by grinding, for example in 2-, 3-, 4- or 5-roll mills, minimills, shaking mills, Ang mills, gear mills, bead mills, wet mills, sand mills, colloid mills, ball mills, specifically stirred ball mills.

In a preferred embodiment ultrasonication of the Lewis Acid-donor complex, preferably the alumium trihalide-donor complex or the alkylaluminum halide complex, or iron trihalide-donor complexes with imidazolium salts in an inert solvent prior to polymerization helps to improve polymerization conversion.

In a preferred embodiment of the present invention, the polymerization is performed with additional use of a mono- or polyfunctional, especially mono-, di- or trifunctional, initiator which is selected from organic hydroxyl compounds, organic halogen compounds and water. It is also possible to use mixtures of the initiators mentioned, for example mixtures of two or more organic hydroxyl compounds, mixtures of two or more organic halogen compounds, mixtures of one or more organic hydroxyl compounds and one or more organic halogen compounds, mixtures of one or more organic hydroxyl compounds and water, or mixtures of one or more organic halogen compounds and water. The initiator may be mono-, di- or polyfunctional, i.e. one, two or more hydroxyl groups or halogen atoms, which start the polymerization reaction, may be present in the initiator molecule. In the case of di- or polyfunctional initiators, telechelic isobutene polymers with two or more, especially two or three, polyisobutene chain ends are typically obtained.

Organic hydroxyl compounds which have only one hydroxyl group in the molecule and are suitable as monofunctional initiators include especially alcohols and phenols, in particular those of the general formula $R^{12}$—OH, in which $R^{12}$ denotes $C_1$- to $C_{20}$-alkyl radicals, especially $C_1$- to $C_8$-alkyl radicals, $C_5$- to $C_8$-cycloalkyl radicals, $C_6$- to $C_{20}$-aryl radicals, especially $C_6$- to $C_{12}$-aryl radicals, or $C_7$- to $C_{20}$-arylalkyl radicals, especially $C_7$- to $C_{12}$-arylalkyl radicals. In addition, the $R^{12}$ radicals may also comprise mixtures of the abovementioned structures and/or have other functional groups than those already mentioned, for example a keto function, a nitroxide or a carboxyl group, and/or heterocyclic structural elements.

Typical examples of such organic monohydroxy compounds are methanol, ethanol, n-propanol, isopropanol, n-butanol, sec-butanol, isobutanol, tert-butanol, n-pentanol, n-hexanol, n-heptanol, n-octanol, 2-ethylhexanol, cyclohexanol, phenol, p-methoxyphenol, o-, m- and p-cresol, benzyl alcohol, p-methoxybenzyl alcohol, 1- and 2-phenylethanol, 1- and 2-(p-methoxyphenyl)ethanol, 1-, 2- and 3-phenyl-1-propanol, 1-, 2- and 3-(p-methoxyphenyl)-1-propanol, 1- and 2-phenyl-2-propanol, 1- and 2-(p-methoxyphenyl)-2-propanol, 1-, 2-, 3- and 4-phenyl-1-butanol, 1-, 2-, 3- and 4-(p-methoxyphenyl)-1-butanol, 1-, 2-, 3- and 4-phenyl-2-butanol, 1-, 2-, 3- and 4-(p-methoxyphenyl)-2-butanol, 9-methyl-9H-fluoren-9-ol, 1,1-diphenylethanol, 1,1-diphenyl-2-propyn-1-ol, 1,1-diphenylpropanol, 4-(1-hydroxy- 1-phenylethyl)benzonitrile, cyclopropyldiphenylmethanol, 1-hydroxy-1,1-diphenylpropan-2-one, benzilic acid, 9-phenyl-9-fluorenol, triphenylmethanol, diphenyl(4-pyridinyl) methanol, alpha,alpha-diphenyl-2-pyridinemethanol, 4-methoxytrityl alcohol (especially polymer-bound as a solid phase), alpha-tert-butyl-4-chloro-4'-methylbenzhydrol, cyclohexyldiphenylmethanol, alpha-(p-tolyl)-benzhydrol, 1,1,2-triphenylethanol, alpha,alpha-diphenyl-2-pyridineethanol, alpha,alpha-4-pyridylbenzhydrol N-oxide, 2-fluorotriphenylmethanol, triphenylpropargyl alcohol, 4-[(diphenyl)hydroxymethyl]benzonitrile, 1-(2,6-dimethoxyphenyl)-2-methyl-1-phenyl-1-propanol, 1,1,2-triphenylpropan-1-ol and p-anisaldehyde carbinol.

Organic hydroxyl compounds which have two hydroxyl groups in the molecule and are suitable as bifunctional initiators are especially dihydric alcohols or diols having a total carbon number of 2 to 30, especially of 3 to 24, in particular of 4 to 20, and bisphenols having a total carbon number of 6 to 30, especially of 8 to 24, in particular of 10 to 20, for example ethylene glycol, 1,2- and 1,3-propylene glycol, 1,4-butylene glycol, 1,6-hexylene glycol, 1,2-, 1,3- or 1,4-bis(1-hydroxy-1-methylethyl)benzene (o-, m- or p-dicumyl alcohol), bisphenol A, 9,10-di-hydro-9,10-dimethyl-9,10-anthracenediol, 1,1-diphenylbutane-1,4-diol, 2-hydroxytriphenylcarbinol and 9-[2-(hydroxymethyl)phenyl]-9-fluorenol.

Organic halogen compounds which have one halogen atom in the molecule and are suitable as monofunctional initiators are in particular compounds of the general formula $R^{13}$-Hal in which Hal is a halogen atom selected from fluorine, iodine and especially chlorine and bromine, and $R^{13}$ denotes $C_1$- to $C_{20}$-alkyl radicals, especially $C_1$- to $C_8$-alkyl radicals, $C_5$- to $C_8$-cycloalkyl radicals or $C_7$- to $C_{20}$-arylalkyl radicals, especially $C_7$- to $C_{12}$-arylalkyl radicals. In addition, the $R^{13}$ radicals may also comprise mixtures of the abovementioned structures and/or have other functional groups than those already mentioned, for example a keto function, a nitroxide or a carboxy) group, and/or heterocyclic structural elements.

Typical examples of such monohalogen compounds are methyl chloride, methyl bromide, ethyl chloride, ethyl bromide, 1-chloropropane, 1-bromopropane, 2-chloropropane, 2-bromopropane, 1-chlorobutane, 1-bromobutane, sec-butyl chloride, sec-butyl bromide, isobutyl chloride, isobutyl bromide, tert-butyl chloride, tert-butyl bromide, 1-chloropentane, 1-bromopentane, 1-chlorohexane, 1-bromohexane, 1-chloroheptane, 1-bromoheptane, 1-chlorooctane, 1-bromooctane, 1-chloro-2-ethylhexane, 1-bromo-2-ethylhexane, cyclohexyl chloride, cyclohexyl bromide, benzyl chloride, benzyl bromide, 1-phenyl-1-chloroethane, 1-phenyl-1-bromoethane, 1-phenyl-2-chloroethane, 1-phenyl-2-bromoethane, 1-phenyl-1-chloropropane, 1-phenyl-1-bromopropane, 1-phenyl-2-chloropropane, 1-phenyl-2-bromopropane, 2-phenyl-2-chloropropane, 2-phenyl-2-bromopropane, 1-phenyl-3-chloropropane, 1-phenyl-3-bromopropane, 1-phenyl-1-chlorobutane, 1-phenyl-1-bromobutane, 1-phenyl-2-chlorobutane, 1-phenyl-2-bromobutane, 1-phenyl-3-chlorobutane, 1-phenyl-3-bromobutane, 1-phenyl-4-chlorobutane, 1-phenyl-4-bromobutane, 2-phenyl-1-chlorobutane, 2-phenyl-1-bromobutane, 2-phenyl-2-chlorobutane, 2-phenyl-2-bromobutane, 2-phenyl-3-chlorobutane, 2-phenyl-3-bromobutane, 2-phenyl-4-chlorobutane and 2-phenyl-4-bromobutane.

Organic halogen compounds which have two halogen atoms in the molecule and are suitable as difunctional initiators are, for example, 1,3-bis(1-bromo-1-methylethyl) benzene, 1,3-bis(2-chloro-2-propyl)benzene (1,3-dicumyl chloride) and 1,4-bis(2-chloro-2-propyl)benzene (1,4-dicumyl chloride).

The initiator is more preferably selected from organic hydroxyl compounds in which one or more hydroxyl groups are each bonded to an spa-hybridized carbon atom, organic halogen compounds, in which one or more halogen atoms are each bonded to an spa-hybridized carbon atom, and water. Among these, preference is given in particular to an initiator selected from organic hydroxyl compounds in which one or more hydroxyl groups are each bonded to an $sp^3$-hybridized carbon atom.

In the case of the organic halogen compounds as initiators, particular preference is further given to those in which the one or more halogen atoms are each bonded to a secondary or especially to a tertiary spa-hybridized carbon atom.

Preference is given in particular to initiators which may bear, on such an spa-hybridized carbon atom, in addition to the hydroxyl group, the $R^{12}$, $R^{13}$ and $R^{14}$ radicals, which are each independently hydrogen, $C_1$- to $C_{20}$-alkyl, $C_5$- to $C_8$-cycloalkyl, $C_6$- to $C_{20}$-aryl, $C_7$- to $C_{20}$-alkylaryl or phenyl, where any aromatic ring may also bear one or more, preferably one or two, $C_1$- to $C_4$-alkyl, $C_1$- to $C_4$-alkoxy, $C_1$- to $C_4$-hydroxyalkyl or $C_1$- to $C_4$-haloalkyl radicals as substituents, where not more than one of the variables $R^{12}$, $R^{13}$ and $R^{14}$ is hydrogen and at least one of the variables $R^{12}$, $R^{13}$ and $R^{14}$ is phenyl which may also bear one or more, preferably one or two, $C_1$- to $C_4$-alkyl, $C_1$- to $C_4$-alkoxy, $C_1$- to $C_4$-hydroxyalkyl or $C_1$- to $C_4$-haloalkyl radicals as substituents.

For the present invention, very particular preference is given to initiators selected from water, methanol, ethanol, 1-phenylethanol, 1-(p-methoxyphenyl)ethanol, n-propanol, isopropanol, 2-phenyl-2-propanol (cumene), n-butanol, isobutanol, sec.-butanol, tert-butanol, 1-phenyl-1-chloroethane, 2-phenyl-2-chloropropane (cumyl chloride), tert-butyl chloride and 1,3- or 1,4-bis(1-hydroxy-1-methylethyl)benzene. Among these, preference is given in particular to initiators selected from water, methanol, ethanol, 1-phenylethanol, 1-(p-methoxyphenyl)ethanol, n-propanol, isopropanol, 2-phenyl-2-propanol (cumene), n-butanol, isobutanol, sec.-butanol, tert-butanol, 1-phenyl-1-chloroethane and 1,3- or 1,4-bis(1-hydroxy-1-methylethyl)benzene.

The molar ratio of the initiators mentioned to the isobutene monomer used in the case of homopolymerization of isobutene, or to the total amount of the polymerizable monomers used in the case of copolymerization of isobutene, based on each individual functional site of the initiator, is generally from 0.0005:1 to 0.1:1, especially 0.001:1 to 0.075:1, in particular 0.0025:1 to 0.05:1. When water is used as the sole initiator or in combination with organic hydroxyl compounds and/or organic halogen compounds as further initiators, the molar ratio of water to the isobutene monomer used in the case of homopolymerization of isobutene, or to the total amount of the polymerizable monomers used in the case of copolymerization of isobutene, is especially from 0.0001:1 to 0.1:1, in particular 0.0002:1 to 0.05:1, preferably 0.0008:1 to 0.04:1, and very preferably in particular 0.001:1 to 0.03:1.

A proportion of the initiator molecules added as organic hydroxyl or halogen compounds is incorporated into the polymer chains. The proportion ($I_{eff}$) of polymer chains which are started by such an incorporated organic initiator molecule may be up to 100%, and is generally 5 to 90%. The remaining polymer chains arise either from water originating from traces of moisture as an initiator molecule, or from chain transfer reactions.

In a further preferred embodiment of the present invention, the polymerization is performed in the presence of 0.01 to 10 mmol, especially of 0.05 to 5.0 mmol, in particular of 0.1 to 1.0 mmol, based in each case on 1 mol of isobutene monomer used in the case of homopolymerization of isobutene, or on 1 mol of the total amount of the polymerizable monomers used in the case of copolymerization of isobutene, of a nitrogen-containing basic compound.

Such a nitrogen-containing basic compound used may be an aliphatic, cycloaliphatic or aromatic amine of the general formula $R^{14}$—$NR^{15}R^{16}$, or else ammonia, in which the variables $R^{14}$, $R^{15}$ and $R^{16}$ are each independently hydrogen, $C_1$- to $C_{20}$-alkyl radicals, especially $C_1$- to $C_8$-alkyl radicals, $C_5$- to $C_8$-cycloalkyl radicals, $C_8$- to $C_{20}$-aryl radicals, especially $C_6$- to $C_{12}$-aryl radicals, or $C_7$- to $C_{20}$-arylalkyl radicals, especially $C_7$- to $C_{12}$-arylalkyl radicals. When none of these variables is hydrogen, the amine is a tertiary amine. When one of these variables is hydrogen, the amine is a secondary amine. When two of these variables is hydrogen, the amine is a primary amine. When all these variables are hydrogen, the amine is ammonia.

Typical examples of such amines of the general formula $R^{14}$—$NR^{15}R^{16}$ are methylamine, ethylamine, n-propylamine, isopropylamine, n-butylamine, tert-butylamine, sec-butylamine, isobutylamine, tert-amylamine, n-hexylamine, n-heptylamine, n-octylamine, 2-ethylhexylamine, cyclopentylamine, cyclohexylamine, aniline, dimethylamine, diethylamine, di-n-propylamine, diisopropylamine, di-n-butylamine, di-tert-butylamine, di-sec-butylamine, diisobutylamine, di-tert-amylamine, di-n-hexylamine, di-n-heptylamine, di-n-octylamine, di-(2-ethylhexyl)amine, dicyclopentylamine, dicyclohexylamine, diphenylamine, trimethylamine, triethylamine, tri-n-propylamine, tri-isopropylamine, tri-n-butylamine, tri-tert-butylamine, tri-sec-butylamine, tri-isobutylamine, tri-tert-amylamine, tri-n-hexylamine, tri-n-heptylamine, tri-n-octylamine, tri-(2-ethylhexyl)amine, tricyclopentylamine, tricyclohexylamine, triphenylamine, dimethylethylamine, methyl-n-butylamine, N-methyl-N-phenylamine, N,N-dimethyl-N-phenylamine, N-methyl-N,N-diphenylamine or N-methyl-N-ethyl-N-n-butylamine.

In addition, such a nitrogen-containing basic compound used may also be a compound having a plurality of, especially having two or three, nitrogen atoms and having 2 to 20 carbon atoms, where these nitrogens may each independently bear hydrogen atoms or aliphatic, cycloaliphatic or aromatic substituents. Examples of such polyamines are 1,2-ethylenediamine, 1,3-propylenediamine, 1,4-butylenediamine, diethylenetriamine, N-methyl-1,2-ethylenediamine, N,N-dimethyl-1,2-ethylenediamine, N,N'-dimethyl-1,2-ethylenediamine or N,N-dimethyl-1,3-propylenediamine.

However, a suitable nitrogen-containing basic compound of this kind is especially a saturated, partly unsaturated or unsaturated nitrogen-containing five-membered or six-membered heterocyclic ring which comprises one, two or three ring nitrogen atoms and may have one or two further ring heteroatoms from the group of oxygen and sulfur and/or hydrocarbyl radicals, especially $C_1$- to $C_4$-alkyl radicals and/or phenyl, and/or functional groups or heteroatoms as substituents, especially fluorine, chlorine, bromine, nitro and/or cyano, for example pyrrolidine, pyrrole, imidazole, 1,2,3- or 1,2,4-triazole, oxazole, thiazole, piperidine, pyrazane, pyrazole, pyridazine, pyrimidine, pyrazine, 1,2,3-, 1,2,4- or 1,2,5-triazine, 1,2,5-oxathiazine, 2H-1,3,5-thiadiazine or morpholine.

However, a very particularly suitable nitrogen-containing basic compound of this kind is pyridine or a derivative of pyridine (especially a mono-, di- or tri-$C_1$- to $C_4$-alkyl-substituted pyridine) such as 2-, 3-, or 4-methylpyridine (picolines), 2,3-, 2,4-, 2,5-, 2,6-, 3,4-, 3,5- or 3,6-dimethylpyridine (lutidines), 2,4,6-trimethylpyridine (collidine), 2-, 3,- or 4-tert-butylpyridine, 2-tert-butyl-6-methylpyridine, 2,4-, 2,5-, 2,6- or 3,5-di-tert-butylpyridine or else 2-, 3,- or 4-phenylpyridine.

It is possible to use a single nitrogen-containing basic compound or mixtures of such nitrogen-containing basic compounds.

For the use of isobutene or of an isobutene-comprising monomer mixture as the monomer to be polymerized, suitable isobutene sources are both pure isobutene and isobutenic $C_4$ hydrocarbon streams, for example $C_4$ raffinates, especially "raffinate 1", $C_4$ cuts from isobutane dehydrogenation, $C_4$ cuts from steam crackers and from FCC crackers (fluid catalyzed cracking), provided that they have been substantially freed of 1,3-butadiene present therein. A $C_4$ hydrocarbon stream from an FCC refinery unit is also known as "b/b" stream. Further suitable isobutenic $C_4$ hydrocarbon streams are, for example, the product stream of a propylene-isobutane cooxidation or the product stream from a metathesis unit, which are generally used after customary purification and/or concentration. Suitable $C_4$ hydrocarbon streams generally comprise less than 500 ppm, preferably less than 200 ppm, of butadiene. The presence of 1-butene and of cis- and trans-2-butene is substantially uncritical. Typically, the isobutene concentration in the $C_4$ hydrocarbon streams mentioned is in the range from 40 to 60% by weight. For instance, raffinate 1 generally consists essentially of 30 to 50% by weight of isobutene, 10 to 50% by weight of 1-butene, 10 to 40% by weight of cis- and trans-2-butene, and 2 to 35% by weight of butanes; in the polymerization process according to the invention, the unbranched butenes in the raffinate 1 generally behave virtually inertly, and only the isobutene is polymerized.

In a preferred embodiment, the monomer source used for the polymerization is a technical $C_4$ hydrocarbon stream with an isobutene content of 1 to 100% by weight, especially of 1 to 99% by weight, in particular of 1 to 90% by weight, more preferably of 30 to 60% by weight, especially a raffinate 1 stream, a b/b stream from an FCC refinery unit, a product stream from a propylene-isobutane cooxidation or a product stream from a metathesis unit.

Especially when a raffinate 1 stream is used as the isobutene source, the use of water as the sole initiator or as a further initiator has been found to be useful, in particular when polymerization is effected at temperatures of −20° C. to +30° C., especially of 0° C. to +20° C. At temperatures of −20° C. to +30° C., especially of 0° C. to +20° C., when a raffinate 1 stream is used as the isobutene source, it is, however, also possible to dispense with the use of an initiator.

The isobutenic monomer mixture mentioned may comprise small amounts of contaminants such as water, carboxylic acids or mineral acids, without there being any critical yield or selectivity losses. It is appropriate to prevent enrichment of these impurities by removing such harmful substances from the isobutenic monomer mixture, for example by adsorption on solid adsorbents such as activated carbon, molecular sieves or ion exchangers.

It is also possible to convert monomer mixtures of isobutene or of the isobutenic hydrocarbon mixture with olefinically unsaturated monomers copolymerizable with isobutene. When monomer mixtures of isobutene are to be copolymerized with suitable comonomers, the monomer mixture preferably comprises at least 5% by weight, more preferably at least 10% by weight and especially at least 20% by weight of isobutene, and preferably at most 95% by weight, more preferably at most 90% by weight and especially at most 80% by weight of comonomers. Useful copolymerizable monomers include: vinylaromatics such as styrene and α-methylstyrene, $C_1$- to $C_4$-alkylstyrenes such as 2-, 3- and 4-methylstyrene, and 4-tert-butylstyrene, halostyrenes such as 2-, 3- or 4-chlorostyrene, and isoolefins having 5 to 10 carbon atoms, such as 2-methylbutene-1,2-methylpentene-1,2-methylhexene-1, 2-ethylpentene-1,2-ethylhexene-1 and 2-propylheptene-1. Further useful comonomers include olefins which have a silyl group, such as 1-trimethoxysilylethene, 1-(trimethoxysilyl)propene, 1-(trimethoxysilyl)-2-methylpropene-2,1-[tri(methoxyethoxy)silyl]ethene, 1-[tri(methoxyethoxy)silyl]propene, and 1-[tri(methoxyethoxy)silyl]-2-methylpropene-2. In addition—depending on the polymerization conditions—useful comonomers also include isoprene, 1-butene and cis- and trans-2-butene.

When the process according to the invention is to be used to prepare copolymers, the process can be configured so as to preferentially form random polymers or to preferentially form block copolymers. To prepare block copolymers, for example, the different monomers can be supplied successively to the polymerization reaction, in which case the second comonomer is especially not added until the first comonomer is already at least partly polymerized. In this manner, diblock, triblock and higher block copolymers are obtainable, which, according to the sequence of monomer addition, have a block of one or the other comonomer as a terminal block. In some cases, however, block copolymers also form when all comonomers are supplied to the polymerization reaction simultaneously, but one of them polymerizes significantly more rapidly than the other(s). This is the case especially when isobutene and a vinylaromatic compound, especially styrene, are copolymerized in the process according to the invention. This preferably forms block copolymers with a terminal polystyrene block. This is attributable to the fact that the vinylaromatic compound, especially styrene, polymerizes significantly more slowly than isobutene.

The polymerization can be effected either continuously or batchwise. Continuous processes can be performed in analogy to known prior art processes for continuous polymerization of isobutene in the presence of boron trifluoride-based catalysts in the liquid phase.

The process according to the invention is suitable either for performance at low temperatures, e.g. at −90° C. to 0° C., or at higher temperatures, i.e. at at least 0° C., e.g. at 0° C. to +30° C. or at 0° C. to +50° C. The polymerization in the process according to the invention is, however, preferably performed at relatively low temperatures, generally at −70° C. to −10° C., especially at −60° C. to −15° C.

When the polymerization in the process according to the invention is effected at or above the boiling temperature of the monomer or monomer mixture to be polymerized, it is preferably performed in pressure vessels, for example in autoclaves or in pressure reactors.

The polymerization in the process according to the invention is preferably performed in the presence of an inert diluent. The inert diluent used should be suitable for reducing the increase in the viscosity of the reaction solution which generally occurs during the polymerization reaction to such an extent that the removal of the heat of reaction which evolves can be ensured. Suitable diluents are those solvents or solvent mixtures which are inert toward the reagents used. Suitable diluents are, for example, aliphatic hydrocarbons such as n-butane, n-pentane, n-hexane, n-heptane, n-octane and isooctane, cycloaliphatic hydrocarbons such as cyclopentane and cyclohexane, aromatic hydrocarbons such as benzene, toluene and the xylenes, and halogenated hydrocarbons, especially halogenated aliphatic hydrocarbons, such as methyl chloride, dichloromethane and trichloromethane (chloroform), 1,1-dichloroethane, 1,2-dichloroethane, trichloroethane and 1-chlorobutane, and also halogenated aromatic hydrocarbons and alkylaromatics halogenated in the alkyl side chains, such as chlorobenzene, monofluoromethylbenzene, difluoromethylbenzene and trifluoromethylbenzene, and mixtures of the aforementioned diluents. The diluents used, or the constituents used in the solvent mixtures mentioned, are also the inert components of isobutenic $C_4$ hydrocarbon streams. A non-halogenated solvent is preferred over the list of halogenated solvents.

The inventive polymerization may be performed in a halogenated hydrocarbon, especially in a halogenated aliphatic hydrocarbon, or in a mixture of halogenated hydrocarbons, especially of halogenated aliphatic hydrocarbons, or in a mixture of at least one halogenated hydrocarbon, especially a halogenated aliphatic hydrocarbon, and at least one aliphatic, cycloaliphatic or aromatic hydrocarbon as an inert diluent, for example a mixture of dichloromethane and n-hexane, typically in a volume ratio of 10:90 to 90:10, especially of 50:50 to 85:15. Prior to use, the diluents are preferably freed of impurities such as water, carboxylic acids or mineral acids, for example by adsorption on solid adsorbents such as activated carbon, molecular sieves or ion exchangers.

In a preferred embodiment, the inventive polymerization is performed in halogen-free aliphatic or especially halogen-free aromatic hydrocarbons, especially toluene. For this embodiment, water in combination with the organic hydroxyl compounds mentioned and/or the organic halogen compounds mentioned, or especially as the sole initiator, have been found to be particularly advantageous.

In another preferred embodiment, the inventive polymerization is performed in halogen-free aliphatic or cycloaliphatic, preferably aliphatic hydrocarbons, especially hexane, pentane, heptane, cyclohexane, cyclopentane, and mixtures comprising them.

The polymerization in the process according to the invention is preferably performed under substantially aprotic and especially under substantially anhydrous reaction conditions. Substantially aprotic and substantially anhydrous reaction conditions are understood to mean that, respectively, the content of protic impurities and the water content in the reaction mixture are less than 50 ppm and especially less than 5 ppm. In general, the feedstocks will therefore be dried before use by physical and/or chemical measures. More particularly, it has been found to be useful to admix the aliphatic or cycloaliphatic hydrocarbons used as solvents, after customary prepurification and predrying with an organometallic compound, for example an organolithium, organomagnesium or organoaluminum compound, in an amount which is sufficient to substantially remove the water traces from the solvent. The solvent thus treated is then preferably condensed directly into the reaction vessel. It is also possible to proceed in a similar manner with the monomers to be polymerized, especially with isobutene or with the isobutenic mixtures. Drying with other customary desiccants such as molecular sieves or predried oxides such as aluminum oxide, silicon dioxide, calcium oxide or barium oxide is also suitable. The halogenated solvents for which drying with metals such as sodium or potassium or with metal alkyls is not an option are freed of water or water traces with desiccants suitable for that purpose, for example with calcium chloride, phosphorus pentoxide or molecular sieves. It is also possible in an analogous manner to dry those feedstocks for which treatment with metal alkyls is likewise not an option, for example vinylaromatic compounds. Even if some or all of the initiator used is water, residual moisture should preferably be very substantially or completely removed from solvents and monomers by drying prior to reaction, in order to be able to use the water initiator in a controlled, specified amount, as a result of which greater process control and reproducibility of the results are obtained.

The polymerization of the isobutene or of the isobutenic starting material generally proceeds spontaneously when the Lewis Acid-donor complex, preferably the aluminum trihalide-donor complex or the alkylaluminum halide complex, especially the alkyl aluminum dichloride-donor complex or dialkyl aluminum chloride-donor complex, is contacted with the isobutene or the isobutenic monomer mixture at the desired reaction temperature. The procedure here may be to initially charge the monomers, optionally in the diluent, to bring it to reaction temperature and then to add the Lewis Acid-donor complex, preferably the aluminum trihalide-donor complex or the alkylaluminum halide complex, especially the alkyl aluminum dichloride-donor complex or dialkyl aluminum chloride-donor complex. The procedure may also be to initially charge the Lewis Acid-donor complex, preferably the aluminum trihalide-donor complex or the alkylaluminum halide complex, especially the alkyl aluminum dichloride-donor complex or dialkyl aluminum chloride-donor complex, optionally in the diluent, and then to add the monomers. In that case, the start of polymerization is considered to be that time at which all reactants are present in the reaction vessel.

To prepare isobutene copolymers, the procedure may be to initially charge the monomers, optionally in the diluent, and then to add the Lewis Acid-donor complex, preferably the aluminum trihalide-donor complex or the alkylaluminum halide complex, especially the alkyl aluminum dichloride-donor complex or dialkyl aluminum chloride-donor complex. The reaction temperature can be established before or after the addition of the Lewis Acid-donor complex, preferably the aluminum trihalide-donor complex or the alkylaluminum halide complex, especially of the alkyl aluminum dichloride-donor complex or dialkyl aluminum chloride-donor complex. The procedure may also be first to initially charge only one of the monomers, optionally in the diluent, then to add the Lewis Acid-donor complex, preferably the aluminum trihalide-donor complex or the alkylaluminum halide complex, especially the alkyl aluminum dichloride-donor complex or dialkyl aluminum chloride-donor complex, and to add the further monomer(s) only after a certain time, for example when at least 60%, at least 80% or at least 90% of the monomer has been converted. Alternatively, the Lewis Acid-donor complex, preferably the aluminum trihalide-donor complex or the alkylaluminum halide complex, especially the alkyl aluminum dichloride-donor complex or dialkyl aluminum chloride-donor complex, can be initially charged, optionally in the diluent, then the monomers can be added simultaneously or successively, and then the desired reaction temperature can be established. In that case, the start of polymerization is considered to be that time at which the Lewis Acid-donor complex, preferably the aluminum trihalide-donor complex or the alkylaluminum halide complex, especially the alkyl aluminum dichloride-donor complex or dialkyl aluminum chloride-donor complex, and at least one of the monomers are present in the reaction vessel.

In addition to the batchwise procedure described here, the polymerization in the process according to the invention can also be configured as a continuous process. In this case, the feedstocks, i.e. the monomer(s) to be polymerized, optionally the diluent and optionally the Lewis Acid-donor complex, preferably the aluminum trihalide-donor complex or the alkylaluminum halide complex, especially the alkyl aluminum dichloride-donor complex or dialkyl aluminum chloride-donor complex, are supplied continuously to the polymerization reaction, and reaction product is withdrawn continuously, such that more or less steady-state polymerization conditions are established in the reactor. The monomer(s) to be polymerized can be supplied as such, diluted with a diluent or solvent, or as a monomer-containing hydrocarbon stream.

The Lewis Acid-donor complex, preferably the aluminum trihalide-donor complex effective as a polymerization catalyst or the alkylaluminum halide complex, especially alkyl aluminum dichloride-donor complex or dialkyl aluminum chloride-donor complex, is generally present in dissolved, dispersed or suspended form in the polymerization medium. Supporting of the Lewis Acid-donor complex, preferably of the aluminum trihalide-donor complex or of the alkylaluminum halide complex, especially of alkyl aluminum dichloride-donor complex or dialkyl aluminum chloride-donor complex, on customary support materials is also possible. Suitable reactor types for the polymerization process of the present invention are typically stirred tank reactors, loop reactors and tubular reactors, but also fluidized bed reactors, stirred tank reactors with or without solvent, fluid bed reactors, continuous fixed bed reactors and batchwise fixed bed reactors (batchwise mode).

In the process according to the invention, the aluminum trihalide-donor complex effective as a polymerization catalyst or the alkylaluminum halide complex, or the iron trihalide-donor complex, or the gallium trihalide-donor complex, or the titanium tetrahalide-donor complex, or the zinc dihalide-donor complex, or the tin dihalide-donor complex, or the tin tetrahalide-donor complex, especially the alkyl aluminum dichloride-donor complex or dialkyl aluminum chloride-donor complex, is generally used in such an amount that the molar ratio of the metal in the Lewis Acid donor complex, preferably the aluminum in the aluminum trihalide-donor complex or alkylaluminum halide complex, especially in the alkyl aluminum dichloride-donor complex or dialkyl aluminum chloride-donor complex, to isobutene in the case of homopolymerization of isobutene, or to the total amount of the polymerizable monomers used in the case of copolymerization of isobutene, is in the range from 1:5 to 1:5000, preferably from 1:10 to 1:5000, especially 1:15 to 1:1000, in particular 1:20 to 1:250.

To stop the reaction, the reaction mixture is preferably deactivated, for example by adding a protic compound, especially by adding water, alcohols such as methanol, ethanol, n-propanol and isopropanol or mixtures thereof with water, or by adding an aqueous base, for example an aqueous solution of an alkali metal or alkaline earth metal hydroxide such as sodium hydroxide, potassium hydroxide, magnesium hydroxide or calcium hydroxide, an alkali metal or alkaline earth metal carbonate such as sodium, potassium, magnesium or calcium carbonate, or an alkali metal or alkaline earth metal hydrogencarbonate such as sodium, potassium, magnesium or calcium hydrogencarbonate.

The process according to the invention serves to prepare high-reactivity isobutene homo- or copolymers with a content of terminal vinylidene double bonds (α-double bonds) per polyisobutene chain end of at least 70, preferably at least 75 and very preferably at least 80 mol %, preferably of at least 85 mol %, more preferably of at least 90 mol %, more preferably of more than 91 mol % and especially of at least 95 mol %, for example of virtually 100 mol %. More particularly, it also serves to prepare high-reactivity isobutene copolymers which are formed from isobutene and at least one vinylaromatic monomer, especially styrene, and have a content of terminal vinylidene double bonds (a-double bonds) per polyisobutene chain end of at least 70, preferably at least 75 mol %, preferably of at least 80 mol %, preferably of at least 85 mol %, more preferably of at least 90 mol %, more preferably of more than 91 mol % and especially of at least 95 mol %, for example of virtually 100 mol %. To prepare such copolymers of isobutene and at least one vinylaromatic monomer, especially styrene, isobutene or an isobutenic hydrocarbon cut is copolymerized with the at least one vinylaromatic monomer in a weight ratio of isobutene to vinylaromatic of 5:95 to 95:5, especially of 30:70 to 70:30.

The high-reactivity isobutene homo- or copolymers prepared by the process according to the invention and specifically the isobutene homopolymers preferably have a polydispersity (PDI=$M_w/M_n$) of 1.05 to less than 3.5, preferably of 1.05 to less than 3.0, preferably of 1.05 to less than 2.5, preferably of 1.05 to 2.3, more preferably of 1.05 to 2.0 and especially of 1.1 to 1.85. Typical PDI values in the case of an optimal process regime are 1.2 to 1.7.

The high-reactivity isobutene homo- or copolymers prepared by the process according to the invention preferably possess a number-average molecular weight $M_n$ (determined by gel permeation chromatography) of preferably 500 to 250 000, more preferably of 500 to 100 000, even more preferably of 500 to 25 000 and especially of 500 to 5000. Isobutene homopolymers even more preferably possess a number-average molecular weight $M_n$ of 500 to 10 000 and especially of 500 to 5000, for example of about 1000 or of about 2300.

Some of the isobutene polymers which have terminal vinylidene double bonds and also comprise incorporated initiator molecules and occur as the predominant proportion in the isobutene homopolymers prepared in accordance with the invention are novel compounds. The present invention therefore also provides isobutene polymers of the general formula I

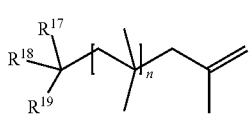
(I)

in which $R^{17}$, $R^{18}$ and $R^{19}$ are each independently hydrogen, $C_1$- to $C_{20}$-alkyl, $C_5$- to $C_8$-cycloalkyl, $C_6$- to $C_{20}$-aryl, $C_7$- to $C_{20}$-alkylaryl or phenyl, where any aromatic ring may also bear one or more $C_1$- to $C_4$-alkyl- or $C_1$- to $C_4$-alkoxy radicals or moieties of the general formula II

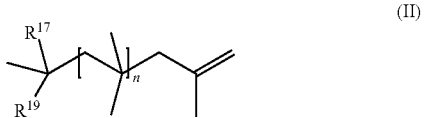
(II)

as substituents, where not more than one of the variables $R^{17}$, $R^{18}$ or $R^{19}$ is hydrogen and at least one of the variables $R^{17}$, $R^{18}$ or $R^{19}$ is phenyl which may also bear one or more $C_1$- to $C_4$-alkyl- or $C_1$- to $C_4$-alkoxy radicals or moieties of the general formula II as substituents, and n is a number from 9 to 4500, preferably 9 to 180, especially 9 to 100, in particular 12 to 50.

In a preferred embodiment, $R^{17}$, $R^{18}$ and $R^{19}$ are each independently hydrogen, $C_1$- to $C_4$-alkyl, especially methyl, ethyl, n-propyl, isopropyl, n-butyl, isobutyl, sec-butyl or tert-butyl, or phenyl which may also bear one or two $C_1$- to $C_4$-alkyl- or $C_1$- to $C_4$-alkoxy radicals or moieties of the general formula II as substituents, where not more than one of the variables $R^{17}$, $R^{18}$ and $R^{19}$ is hydrogen and at least one of the variables $R^{17}$, $R^{18}$ and $R^{19}$ is phenyl which may also bear one or two $C_1$- to $C_4$-alkyl or $C_1$- to $C_4$-alkoxy radicals or moieties of the general formula II as substituents, and n is a number from 9 to 4500, preferably 9 to 180, especially 9 to 90, in particular 15 to 45.

The process according to the invention successfully polymerizes isobutene or isobutene-comprising monomer mixtures under cationic conditions with satisfactory to high conversions of generally 20 to 100%, especially 35 to 90%, in short reaction times of generally 5 to 120 minutes, especially 30 to 120 minutes, to give high-reactivity isobutene homo- or copolymers with a content of terminal vinylidene double bonds per polyisobutene chain end of at least 70, preferably at least 75 and very preferably at least 80 mol % and with a narrow molecular weight distribution.

It is an advantage of the process according to the present invention that a mixture of at least one organic compound (II), preferably at least one organic compound with at least one ether function and at least one imidazolium salt of the general formula (I) as donors yield a product with an increased content of terminal vinylidene double bonds per polyisobutene chain end compared and/or a narrower molecular weight distribution compared with the same reaction carried out in the presence of an imidazolium salt as a donor alone under comparable reaction conditions.

The examples which follow are intended to illustrate the present invention in detail without restricting it.

EXAMPLES

Example 1

The Use of [emim]Cl—AlCl$_3$ as Catalyst

The polymerization reactions were carried out in glass tubes equipped with a cold finger condenser or, in some cases, in stainless steel reactor with PTFE lining under argon atmosphere at the temperature given in the Tables. As an example of a typical procedure, polymerization was initiated by adding of isobutylene (2.86 g, 5.1×10$^{-2}$ mol) to a mixture of a total volume 4.9 mL consisting of solutions of diisopropyl ether (0.11 mL, 1 M), [emim]Cl—AlCl$_3$ (0.056 mL) and n-hexane (4.8 mL). After a predetermined time given in the Tables, ca. 2 mL of aqueous ammonia (25%) was poured into the glass reactor to terminate the polymerization. The quenched reaction mixtures were diluted with n-hexane and filtered, evaporated to dryness under reduced pressure, and dried in vacuum (60° C.) to give the product polymers. Monomer conversions were determined gravimetrically.

Example 2

Effect of Ultrasonication

Polymerization was performed as in Example 1 but the suspension of [emim]Cl—AlCl$_3$ in n-hexane was ultrasonicated during 3 min before the addition of isobutylene.
Process conditions are shown in Table 1 below

Example 3

The Use of [emim]Cl-FeCl$_3$ as Catalyst

Polymerization was performed as in Example 1 but [emim]Cl—FeCl$_3$ was used as catalyst instead of [emim]Cl—AlCl$_3$

Example 4

The Use of [emim]Cl—GaCl$_3$ as Catalyst

Polymerization was performed as in Example 1 but [emim]Cl—GaCl$_3$ was used as catalyst instead of [emim]Cl—AlCl$_3$

Example 5

The Use of [bmim]Cl—TiCl$_4$ as Catalyst

Polymerization was performed as in Example 1 but [bmim]Cl—TiCl$_4$ was used as catalyst instead of [emim]Cl—AlCl$_3$

Example 6

The Use of [emim]Cl—FeCl3 as Catalyst Without an Addition of Ether

Polymerization was performed as in Example 3 but without an addition of ether.

Process conditions are shown in the Table 2 below.

Product yields were determined gravimetrically. The number average molecular weight $M_n$ and the weight average molecular weight $M_w$ was determined by means of Size Exclusion Chromatography (SEC, MnSEC) with polystyrene standards, or by $^1$H NMR ($M_{nNMR}$). The polydispersity PDI=$M_w/M_n$ was calculated using the thus obtained values.

Composition of reaction products was determined by the $^1$H-NMR method and assigned to structures as described in Shiman, D. I.; Vasilenko, I. V.; Kostjuk, S. V. "Cationic Polymerization of Isobutylene by AlCl$_3$/Ether Complexes in Non-Polar Solvents: Effect of Ether Structure on the Selectivity of β-H Elimination", *Polymer* 2013, 54, 2235-2242, FIG. 4.

The $^1$H-NMR shifts are attributed to the structural elements as seen in FIG. 1.

In the context of the present invention the term "exo" refers to terminal ethylenic double bonds, vinylidene groups or a-double bonds, as shown in the formula on page 1. These terms are used synonymously throughout the text.

The term "Total vinylidene" means the terminal ethylenic double bonds referred to as exo above and additionally double bonds located internally at the polymer backbone as shown in the following formula:

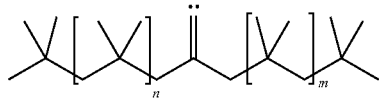

The terms "endo" and "trisubstituted" refer to β-double bonds, as shown in the formulae above in the second line. These terms are used synonymously throughout the text.

Furthermore "tetrasubstituted" structural elements can be found as shown in the formula at the top right. Furthermore, a chlorinated polyisobutene (PIBCI) was found.

TABLE 1

Polymerization of Isobutylene in n-Hexane for 30 min Catalyzed by [emim]Cl—AlCl$_3$ ($\chi$(AlCl$_3$) = 0.6) Ionic Liquid (IL) in the Presence of Diisopropyl Ether $^a$

| run | temp. (° C.) | ether/IL (mol/mol) | conv. (%) | $M_n$(SEC) (g mol$^{-1}$) | $M_n$(NMR)$^b$ (g mol$^{-1}$) | $M_w/M_n$ | exo | endo + tri | tetra | PIBCI |
|---|---|---|---|---|---|---|---|---|---|---|
| 1 | 0 | –$^c$ | 100 | 1500 | 1360 | 6.8 | 2 | 74 | 24 | 0 |
| 2 | 0 | 0.5 | 51 | 3940 | 3340 | 2.0 | 92 | 4 | 3 | 1 |
| 2.1$^k$ | 0 | 0.5 | 65 | 4200 | 3600 | 2.5 | 89 | 5 | 4 | 2 |
| 3$^d$ | 0 | 0.5 | 12 | 9350 | 5170 | 1.6 | 86 | 6 | 5 | 3 |
| 4$^e$ | 0 | 0.5 | 90 | 2700 | 1510 | 4.0 | 3 | 69 | 26 | 2 |
| 5$^f$ | 0 | 1.0 | 28 | 4900 | 3240 | 1.9 | 95 | 2 | 1 | 2 |
| 6 | 0 | 0.4 | 57 | 7750 | 4460 | 1.7 | 84 | 6 | 8 | 2 |
| 7$^g$ | 0 | 0.35 | 62 | 6500 | 4510 | 1.9 | 89 | 4 | 4 | 3 |
| 8 | 0 | 0.3 | 71 | 12900 | 9570 | 1.8 | 47 | 30 | 19 | 4 |
| 9 | -20 | 0.5 | 54 | 9200 | 4630 | 3.3 | 36 | 45 | 17 | 2 |
| 10 | -10 | 0.5 | 13 | 5760 | 6520 | 2.9 | 67 | 15 | 15 | 3 |
| 11 | 10 | 0.5 | 59 | 5600 | 4650 | 2.0 | 90 | 6 | 3 | 1 |

TABLE 1-continued

Polymerization of Isobutylene in n-Hexane for 30 min Catalyzed by [emim]Cl—AlCl$_3$ ($\chi$(AlCl$_3$) = 0.6) Ionic Liquid (IL) in the Presence of Diisopropyl Ether [a]

| run | temp. (° C.) | ether/IL (mol/mol) | conv. (%) | M$_n$(SEC) (g mol$^{-1}$) | M$_n$(NMR)[b] (g mol$^{-1}$) | M$_w$/M$_n$ | end groups distribution (%) | | | |
|---|---|---|---|---|---|---|---|---|---|---|
| | | | | | | | exo | endo + tri | tetra | PIBCl |
| 12[h] | 10 | 1.0 | 57 | 3470 | 2900 | 2.7 | 69 | 11 | 17 | 3 |
| 13[i,j] | 10 | 0.9 | 55 | 1400 | 1060 | 3.6 | 84 | 5 | 7 | <1 |

[a] [emim]Cl—AlCl$_3$ = 22 mM; [IB] = 5.2M.
[b] Calculated based on the end groups content as M$_n$(NMR) = 56.11 × [(i/2)/((b + b')/2) + d + e + g + k/6], see formula above.
[c] No ether was added to the system (for comparison).
[d] $^i$Bu$_2$O was used instead of $^i$Pr$_2$O.
[e] tBuOMe was used instead of $^i$Pr$_2$O.
[f] [emim]Cl—AlCl$_3$ = 11 mM;
[g] [emim]Cl—AlCl$_3$ = 33 mM.
[h] AlCl$_3$ × OiPr$_2$ (22 mM) was used as catalyst instead of IL.
[i] EtAlCl$_2$ × O$^i$Pr$_2$ was used as catalysts instead of IL.
[j] Among exo, endo-, tri- and tetra-substituted olefinic groups 4% of coupled polymer chains are presented.
[k] Hexane/IL mixture was ultrasonicated during 3 min

TABLE 2

Polymerization of Isobutylene in n-Hexane for 30 min at 0° C. Catalyzed by [emim]Cl—FeCl$_3$ ($\chi$(FeCl$_3$) = 0.6) Ionic Liquid (IL) in the Presence of Diisopropyl Ether [a]

| run | [IL] mM | ether/IL (mol/mol) | conv. (%) | M$_n$(SEC) (g mol$^{-1}$) | M$_w$/M$_n$ | end groups distribution (%) | | | |
|---|---|---|---|---|---|---|---|---|---|
| | | | | | | exo | endo + tri | tetra | PIBCl |
| 14 | 22 | 0.5 | 18 | 1700 | 2.2 | 84 | 7 | 3 | 4 |
| 15 | 33 | 0.33 | 32 | 2600 | 2.4 | 85 | 6 | 5 | 2 |
| 16 | 44 | 0.25 | 95 | 1800 | 2.5 | 87 | 8 | 3 | 1 |
| 17[b] | 11 | 1.0 | 20 | 3500 | 1.9 | 85 | 7 | 4 | 3 |
| 18 | 22 | 0.5 | 18 | 1700 | 2.2 | 84 | 7 | 3 | 4 |
| 19[b] | 22 | 0.5 | 30 | 2500 | 2.6 | 87 | 6 | 3 | 3 |
| 20 | 33 | 0.33 | 32 | 2600 | 2.4 | 85 | 6 | 5 | 2 |
| 21[b] | 33 | 0.33 | 71 | 2900 | 1.9 | 85 | 10 | 3 | 1 |
| 22 | 44 | 0.25 | 95 | 1800 | 2.5 | 87 | 8 | 3 | 1 |
| 23[b,c] | 44 | 0.25 | 61 | 2700 | 2.1 | 84 | 7 | 5 | 1 |
| 24[b] | 44 | 0.25 | 100 | 1800 | 3.8 | 77 | 12 | 9 | 1 |
| 25[b,d] | 22 | 0.5 | 83 | 700 | 2.3 | 84 | 8 | 1 | 0 |
| 26[e] | 22 | 0.5 | 21 | 1980 | 1.9 | 87 | 3 | 2 | 8 |
| 27[f] | 22 | 0.5 | 12 | 2500 | 5.2 | 86 | 5 | 8 | 1 |
| 28[g] | 22 | — | 27 | 5400 | 3.8 | 54 | 20 | 19 | 7 |

[a] [IB] = 4.8M
[b] Hexane/IL mixture was ultrasonicated during 3 min
[c] Reaction time: 10 min
[d] ClEtOEt was used instead of diisopropyl ether
[e] [emim]Cl—GaCl$_3$ was used as catalyst instead of [emim]Cl—FeCl$_3$
[f] [bmim]Cl—TiCl$_4$ was used as catalyst instead of [emim]Cl—FeCl$_3$
[g] No ether was added to the system (for comparison)

The invention claimed is:

1. A process for preparing high-reactivity isobutene homopolymers or copolymers with a content of terminal vinylidene double bonds per polyisobutene chain end of at least 70 mol %, the process comprising:
polymerizing a monomer comprising isobutene in the presence of a Lewis acid polymerization catalyst comprising (a) an aluminum trihalide-donor complex, an alkylaluminum halide-donor complex, an iron trihalide-donor complex, a gallium trihalide-donor complex, a titanium tetrahalide-donor complex, a zinc dihalide-donor complex, a tin dihalide-donor complex, and/or a tin tetrahalide-donor complex (b) a mixture comprising an organic compound (II) comprising an oxygen or nitrogen atom with at least one lone electron pair, and (c) an ionic liquid,
thereby obtaining the high-reactivity isobutene homopolymers or copolymers having a number-average molecular weight in a range of from 500 to 10,000, determined by gel permeation chromatography, and having the content of the terminal vinylidene double bonds per polyisobutene chain end of at least 70 mol %.

2. The process of claim 1, wherein the ionic liquid comprises a cation of a formula (Ia) to (Iw):

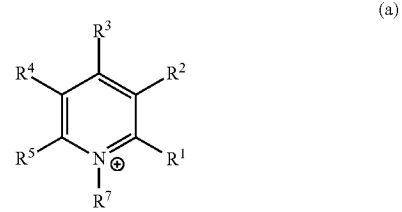

-continued
(b) 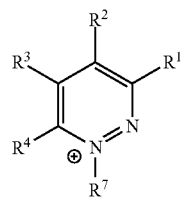
(c) 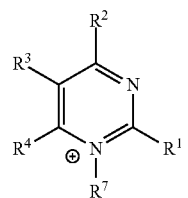
(d) 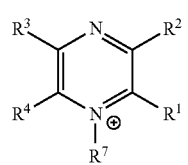
(e) 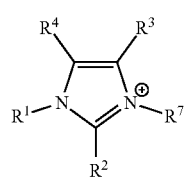
(f) 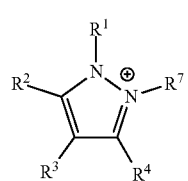
(g) 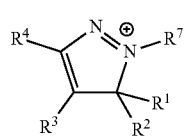
(h) 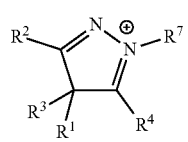
(i) 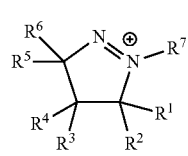
(m) 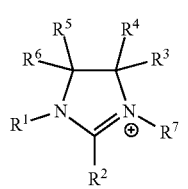
(n) 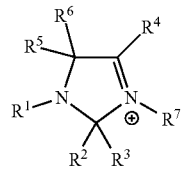
(o) 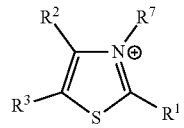
(p) 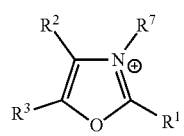
(q) 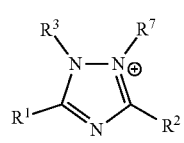
(r) 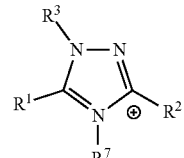
(s) 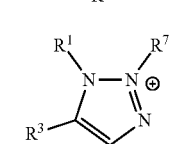
(t) 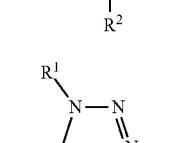
(u) 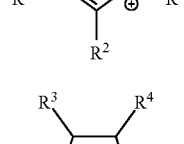
(v) 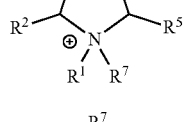
(w) 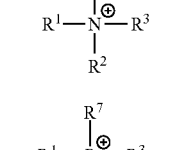
and oligomers and polymers in which these structures are present, wherein R$^1$, R$^2$, R$^3$, R$^4$, R$^5$, R$^6$, and R$^7$ are independently C$_1$-C$_{18}$-alkyl, C$_2$-C$_{18}$-alkyl interrupted by one or more oxygen and/or sulfur atoms and/or one or more substituted or unsubstituted imino groups, C$_6$-C$_{12}$-aryl, C$_5$-C$_{12}$-cycloalkyl or a five- or six-membered, oxygen-, nitrogen- and/or sulfur-containing heterocycle or two of them together form an unsaturated, saturated or aromatic ring which may be interrupted by one or more oxygen and/or sulfur atoms and/or one or more substituted or unsubstituted imino groups, where the radicals mentioned are optionally substituted by functional groups comprising an aryl, alkyl, aryloxy, alkyloxy, halogen, heteroatom, and/or heterocycle.

3. The process of claim 1, wherein the ionic liquid comprises a fluoride, chloride, bromide, iodide, thiocyanate, hexafluorophosphate, trifluoromethanesulfonate, methanesulfonate, carboxylate, mandelate, nitrate, nitrite, trifluoroacetate, sulfate, hydrogensulfate, methylsulfate, ethylsulfate, 1-propyl sulfate, 1-butyl sulfate, 1-hexyl sulfate, 1-octylsulfate, sulfite, hydrogensulfite, phosphate, dihydrogenphosphate, hydrogenphosphate, C$_1$-C$_4$-dialkylphosphate, carbonate, hydrogencarbonate, propionate, tetrachloroaluminate, Al$_2$Cl$_7$—, Al$_3$Cl$_{10}$—, chlorozincate, chloroferrate, chlorocuprate, bis(trifluoromethylsulfonyl)imide, bis(pentafluoroethylsulfonyl)imide, bis(methylsulfonyl)imide, bis(p-tolylsulfonyl)imide, tris(trifluoromethylsulfonyl)methide, bis(pentafluoroethylsulfonyl)methide, p-tolylsulfonate, tetracarbonylcobaltate, dimethyleneglycolmonomethylethersulfate, oleate, stearate, acrylate, methacrylate, maleate, hydrogencitrate, vinylphosphonate, bis(pentafluoroethyl)phosphinate, borate, dicyanamide, tris(pentafluoroethyl)trifluorophosphate, tris(heptafluoropropyl)trifluorophosphate, cyclic arylphosphate, and/or chlorocobaltate anion.

4. The process of claim 1, wherein the ionic liquid is an imidazolium salt of formula (I):

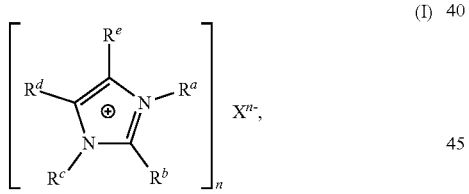

(I)

wherein:

R$^a$ and R$^c$ are independently an organic radical comprising 1 to 3000 carbon atoms, R$^b$, R$^d$, and R$^e$ are independently hydrogen or an organic radical comprising 1 to 3000 carbon atoms, X is an anion, and n is 1, 2, or 3.

5. The process of claim 1, wherein the polymerization catalyst comprising the aluminum trihalide-donor complex, an alkylaluminum halide-donor complex, an iron trihalide-donor complex, a gallium trihalide-donor complex, or a titanium tetrahalide-donor complex.

6. The process of claim 1, wherein the Lewis acid polymerization catalyst comprises an aluminum trichloride-donor complex or an alkylaluminum halide-donor complex or an iron-trihalide donor complex.

7. The process of claim 1, wherein the organic compound (II) comprises an ether, carboxylic ester, aldehyde function, or keto function.

8. The process of claim 5, wherein the organic compound (II) is an ether of formula

R$^8$—O—R$^9$ wherein

R$^8$ and R$^9$ are each independently a C$_1$- to C$_{20}$-alkyl radical, C$_1$- to C$_{20}$-haloalkyl radical, C$_5$- to C$_8$-cycloalkyl radical, C$_6$- to C$_{20}$-aryl radical, C$_6$- to C$_{20}$-haloaryl radicals, or C$_7$- to C$_{20}$-arylalkyl radical.

9. The process of claim 1, wherein the organic compound (II) comprises an ether comprising a secondary hydrocarbon group, tertiary hydrocarbon group, or halide-substituted hydrocarbon.

10. The process of claim 1, wherein the organic compound (II) is diethyl ether, di-n-butyl ether, di-isopropyl ether, di-n-propyl ether, and/or chloroethyl ethyl ether.

11. The process of claim 4, wherein R$^a$ to R$^e$ are independently a C$_1$- to C$_{20}$-alkyl group, R$^b$, R$^d$, and R$^e$ optionally being hydrogen.

12. The process of claim 4, wherein R$^a$ and R$^c$ are independently a C$_1$- to C$_{20}$-alkyl group, R$^b$, R$^d$, and R$^e$ are each hydrogen.

13. The process of claim 4, wherein R$^a$ and R$^c$ are independently methyl, ethyl, n-propyl, isopropyl, n-butyl, tert-butyl, pentyl, n-hexyl, 2-methylpentyl, n-heptyl, n-octyl, 2-ethylhexyl, n-decyl, n-dodecyl, tallow fatty alkyl radicals, or n-eicosyl.

14. The process of claim 4, wherein X is sulfate, alkylsulfate, alkylsulfonate, alkylcarbonate, halide, pseudohalide, carboxylate, phosphate, phosphonate, nitrate, nitrite, N(SO$_2$CF$_3$)$_2^-$, or tricyanomethanide.

15. The process of claim 1, wherein a homopolymerization of isobutene is carried out and a molar ratio of the aluminum trihalide or alkylaluminum halide to the isobutene, based on each individual functional site of the aluminum trihalide or alkylaluminum halide, is in a range of from 0.001:1 to 0.2:1, or wherein a copolymerization of isobutene is carried out and a molar ratio of the aluminum trihalide or alkylaluminum halide to a total amount of polymerizable monomers, based on each individual functional site of the aluminum trihalide or alkylaluminum halide, is in a range of from 0.001:1 to 0.2:1.

16. The process of claim 1, wherein the polymerization is performed with additional use of a monofunctional or polyfunctional initiator which is an organic hydroxyl compound comprising a hydroxyl group bonded to an sp$^3$-hybridized carbon atom, or an organic halogen compound comprising a halogen atom bonded to an sp$^3$-hybridized carbon atom and water.

17. The process of claim 16, wherein the initiator is water, methanol, ethanol, 1-phenylethanol, 1-(p-methoxyphenyl)ethanol, n-propanol, isopropanol, 2-phenyl-2-propanol, n-butanol, isobutanol, sec.-butanol, tert-butanol, 1-phenyl-1-chloroethane, 2-phenyl-2-chloropropane, tert-butyl chloride, 1,3-bis(1-hydroxy-1-methylethyl)benzene, or 1,4-bis(1-hydroxy-1-methylethyl)benzene.

18. The process of claim 16, wherein a molar ratio of the initiator to the isobutene monomer used in the case of homopolymerization of the isobutene, or to a total amount of polymerizable monomers used in copolymerization of the isobutene, based on each individual functional site of the initiator, is in a range of from 0.0005:1 to 0.1:1, or wherein, when water is used as a sole initiator or in combination with organic hydroxyl compounds and/or organic halogen compounds as further initiators, a molar ratio of the water to the isobutene used in homopolymerization of the isobutene, or to a total amount of polymerizable monomers used in copolymerization of the isobutene, is in a range of from 0.0001:1 to 0.1:1.

19. The process of claim 1, wherein the polymerization is performed at a temperature of −90° C. to +30° C.

20. The process of claim 1, further comprising:
dispersing the Lewis acid polymerization catalyst in an inert solvent prior to the polymerizing.

* * * * *

UNITED STATES PATENT AND TRADEMARK OFFICE
CERTIFICATE OF CORRECTION

PATENT NO.         : 10,975,175 B2                         Page 1 of 1
APPLICATION NO.    : 16/318749
DATED              : April 13, 2021
INVENTOR(S)        : Rosa Corberan Roc et al.

It is certified that error appears in the above-identified patent and that said Letters Patent is hereby corrected as shown below:

On the Title Page

Item (56) In the second page under Other Publications, two references currently read:
"U.S. Appl. No. 16/073,586, Sep. 27, 2018" and
"U.S. Appl. No. 16/074,229, Sep. 31, 2018"

And should read:
-- U.S. Appl. No. 16/073,586, July 27, 2018 -- and
-- U.S. Appl. No. 16/074,229, July 31, 2018 --, respectively.

Signed and Sealed this
Fifteenth Day of June, 2021

Drew Hirshfeld
*Performing the Functions and Duties of the
Under Secretary of Commerce for Intellectual Property and
Director of the United States Patent and Trademark Office*